United States Patent
Kim et al.

(10) Patent No.: US 10,186,918 B2
(45) Date of Patent: Jan. 22, 2019

(54) MOTOR AND ITS ROTOR

(71) Applicant: Samsung Electronics Co., Ltd., Suwon-si (KR)

(72) Inventors: Sung Il Kim, Seoul (KR); Won Ho Kim, Hwaseong-si (KR); Seong Taek Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 713 days.

(21) Appl. No.: 14/751,514

(22) Filed: Jun. 26, 2015

(65) Prior Publication Data
US 2015/0380996 A1 Dec. 31, 2015

(30) Foreign Application Priority Data

Jun. 27, 2014 (KR) ........................ 10-2014-0080221
Jan. 20, 2015 (KR) ........................ 10-2015-0009158

(51) Int. Cl.
*H02K 1/27* (2006.01)

(52) U.S. Cl.
CPC .................................. *H02K 1/2773* (2013.01)

(58) Field of Classification Search
CPC ......................................... H02K 1/272–1/2773
See application file for complete search history.

(56) References Cited

U.S. PATENT DOCUMENTS

| 5,159,220 A | 10/1992 | Kliman |
| 8,227,953 B2 * | 7/2012 | Suzuki ................. H02K 1/2766 310/156.53 |

FOREIGN PATENT DOCUMENTS

| DE | 102012207243 | 11/2013 |
| DE | 102013223671 | 6/2014 |
| EP | 1973217 | 9/2008 |
| JP | 2006-50821 | 2/2006 |

OTHER PUBLICATIONS

Extended European Search Report dated Aug. 3, 2016 in European Patent Application No. 15174111.3.
European Decision on Grant dated Mar. 22, 2017 in European Patent Application No. 15174111.3.

* cited by examiner

*Primary Examiner* — Ramon M Barrera
(74) *Attorney, Agent, or Firm* — Staas & Halsey LLP

(57) ABSTRACT

A motor that minimizes demagnetization to improve a force resistant to the demagnetization without increasing a thickness of each permanent magnet and a distance between each permanent magnet and a stator includes a rotor that rotates in one direction and includes cavities configured to hold magnets, flux barriers configured to communicate with first ends of the cavities and formed adjacent to an outer circumferential surface of the rotor, and ribs formed between the outer circumferential surface of the rotor and the flux barriers. Each of the ribs is configured such that a width of one end thereof at an upstream side in a rotational direction of the rotor is wider than that of the other thereof at a downstream side in the rotational direction.

7 Claims, 26 Drawing Sheets

(A)

(B)

(A)

(B)

[ANALYSES OF NO-LOAD BACK EMF AND HARMONIC]

[LOAD LINE AT END OF PERMANENT MAGNET (30A $_{Peak}$)]

MOTOR AND ITS ROTOR

CROSS-REFERENCE TO RELATED APPLICATIONS

This application claims the priority benefit of Korean Patent Application No. 10-2014-0080221, filed on Jun. 27, 2014 in the Korean Intellectual Property Office, and Korean Patent Application No. 10-2015-0009158, filed on Jan. 20, 2015 in the Korean Intellectual Property Office, the disclosures of which are incorporated herein by reference.

BACKGROUND

1. Field

The following description relates to a motor (electric motor) that converts electrical energy into kinetic energy and, more particularly, to a permanent magnet motor in which permanent magnets are coupled to a rotor.

2. Description of the Related Art

Motors are devices for converting electrical energy into kinetic energy. Various types of motors classified according to structure and function are used throughout the industry. One of these various types of motors is a spoke type motor in which permanent magnets are used in a rotor and are disposed in a spoke form. In the spoke type motor, local demagnetization may occur at ends of the permanent magnets. This local demagnetization is responsible for degrading performance of the spoke type motor.

Therefore, a scheme for minimizing the local demagnetization (or improving a force resistant to demagnetization) in the spoke type motor to improve the performance of the spoke type motor is desired.

SUMMARY

Therefore, it is an aspect of the present disclosure to minimize demagnetization to improve a force resistant to the demagnetization in a permanent magnet motor without increasing a thickness of each permanent magnet as well as a distance between each permanent magnet and a stator.

Additional aspects of the disclosure will be set forth in part in the description which follows and, in part, will be obvious from the description, or may be learned by practice of the disclosure.

In accordance with an aspect of the present disclosure, a rotor of a motor rotates in one direction, and includes: cavities configured to hold magnets; flux barriers configured to communicate with first ends of the cavities and formed adjacent to an outer circumferential surface of the rotor; and ribs formed between the outer circumferential surface of the rotor and the flux barriers. Each of the ribs is configured such that a width of one end thereof at an upstream side in a rotational direction of the rotor is wider than that of the other thereof at a downstream side in the rotational direction.

In the rotor, each of the ribs is formed long in a circumferential direction of the rotor.

In the rotor, the width of the one end of each of the ribs is sharply reduced in the rotational direction, and the width of the other end of each of the ribs is gently reduced in the rotational direction.

In the rotor, the widths of the opposite ends of each of the ribs are sharply reduced in the rotational direction, and a width of an intermediate portion of each of the ribs is gently reduced in the rotational direction.

In the rotor, each of the flux barriers is configured such that a width of one end thereof at an upstream side in a rotational direction of the rotor is narrower than a width of the other end thereof at a downstream side in the rotational direction.

In the rotor, each of the flux barriers is configured such that widths of the opposite ends thereof at an upstream side in a rotational direction of the rotor are narrower than a width of an intermediate portion of each of the ribs.

In the rotor, the cavities, the flux barriers, and the ribs are continuously formed from a rotating shaft toward the outer circumferential surface of the rotor.

In the rotor, the cavities are configured such that: a first cavity for holding a first permanent magnet and a second cavity for holding a second permanent magnet constitute one pole; and the first and second cavities are radially disposed around a rotating shaft of the rotor toward the outer circumferential surface.

In the rotor, the first and second cavities have a V shape in which they spread from the center of the rotating shaft of the rotor toward the outer circumferential surface.

In the rotor, the cavities are configured such that: each cavity for holding one of the permanent magnets constitutes one pole; and the cavities are formed long toward the outer circumferential surface around a rotating shaft of the rotor.

In the rotor, each cavity has a linear "I" shape formed long from the center of the rotating shaft of the rotor toward the outer circumferential surface.

In accordance with an aspect of the present disclosure, a rotor of a motor rotates in both directions and includes: cavities configured to hold magnets; flux barriers configured to communicate with first ends of the cavities and formed adjacent to an outer circumferential surface of the rotor; and ribs formed between the outer circumferential surface of the rotor and the flux barriers. Each of the ribs is formed long in a rotational direction of the rotor and has a shape in which widths of opposite ends thereof are wider than that of an intermediate portion thereof.

In the rotor, each of the ribs is formed long in a circumferential direction of the rotor.

In the rotor, the width of the one end of each of the ribs is sharply reduced in the rotational direction, and the width of the other end of each of the ribs is gently reduced in the rotational direction.

In the rotor, the widths of the opposite ends of each of the ribs are sharply reduced in the rotational direction, and a width of an intermediate portion of each of the ribs is gently reduced in the rotational direction.

In the rotor, each of the flux barriers is configured such that a width of one end thereof at an upstream side in a rotational direction of the rotor is narrower than a width of the other end thereof at a downstream side in the rotational direction.

In the rotor, each of the flux barriers is configured such that widths of the opposite ends thereof at an upstream side in a rotational direction of the rotor are narrower than a width of an intermediate portion of the rib.

In the rotor, the cavities, the flux barriers, and the ribs are continuously formed from a rotating shaft toward the outer circumferential surface of the rotor.

In the rotor, the cavities are configured such that: a first cavity for holding a first permanent magnet and a second cavity for holding a second permanent magnet constitute one pole; and the first and second cavities are radially disposed around a rotating shaft of the rotor toward the outer circumferential surface.

In the rotor, the first and second cavities have a V shape in which they spread from the center of the rotating shaft of the rotor toward the outer circumferential surface.

In the rotor, the cavities are configured such that: each cavity for holding one of the permanent magnets constitutes one pole; and the cavities are formed long toward the outer circumferential surface around a rotating shaft of the rotor.

In the rotor, each cavity has a linear "I" shape formed long from the center of the rotating shaft of the rotor toward the outer circumferential surface.

In accordance with an aspect of the present disclosure, a motor includes: a stator in which coils are wound; and a rotor rotatably installed inside the stator and having at least one magnet held therein. The rotor includes: cavities configured to hold the magnets; flux barriers configured to communicate with first ends of the cavities and formed adjacent to an outer circumferential surface of the rotor; and ribs formed between the outer circumferential surface of the rotor and the flux barriers. Each of the ribs is configured such that a width of one end thereof at an upstream side in a rotational direction of the rotor is wider than that of the other thereof at a downstream side in the rotational direction.

In the motor, each of the ribs is formed long in a circumferential direction of the rotor.

In the motor, the width of the one end of each of the ribs is sharply reduced in the rotational direction, and the width of the other end of each of the ribs is gently reduced in the rotational direction.

In the motor, the widths of the opposite ends of each of the ribs are sharply reduced in the rotational direction, and a width of an intermediate portion of each of the ribs is gently reduced in the rotational direction.

In accordance with an aspect of the present disclosure, a motor includes: a stator in which coils are wound; and a rotor rotatably installed inside the stator and having at least one magnet held therein. The rotor includes: cavities configured to hold the magnets; flux barriers configured to communicate with first ends of the cavities and formed adjacent to an outer circumferential surface of the rotor; and ribs formed between the outer circumferential surface of the rotor and the flux barriers. Each of the ribs is formed long in a rotational direction of the rotor and has a shape in which widths of opposite ends thereof are wider than that of an intermediate portion thereof.

In the motor, each of the ribs is formed long in a circumferential direction of the rotor.

In the motor, the width of the one end of each of the ribs is sharply reduced in the rotational direction, and the width of the other end of each of the ribs is gently reduced in the rotational direction.

In the motor, the widths of the opposite ends of each of the ribs are sharply reduced in the rotational direction, and a width of an intermediate portion of each of the ribs is gently reduced in the rotational direction.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
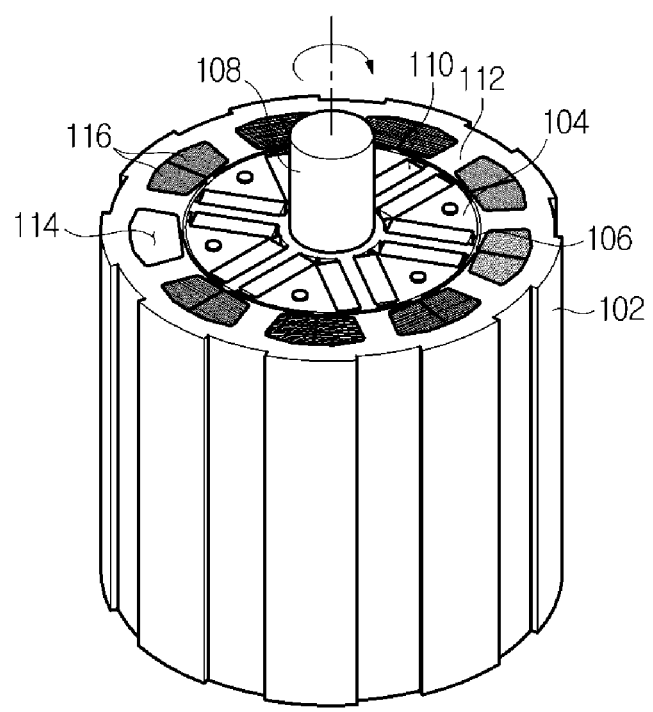
FIG. 1 is a view illustrating an assembly of a stator and rotor of a motor according to an embodiment of the present disclosure.

Reference will now be made in detail to the embodiments of the present disclosure, examples of which are illustrated in the accompanying drawings, wherein like reference numerals refer to like elements throughout.

FIG. 1 is a view illustrating an assembly of a stator and rotor of a motor according to an embodiment of the present disclosure. As illustrated in FIG. 1, a cylindrical rotor 104 is rotatably installed inside a cylindrical stator 102. A gap is present between an inner surface of the stator 102 and an outer surface of the rotor 104 such that the rotor 104 can be smoothly rotated inside the stator 102 with no contact. A rotating shaft 108 is provided inside the rotor 104. The rotor 104 rotates about the rotating shaft 108.

The stator 102 and the rotor 104 may be protected by a case (not shown). The rotating shaft 108 is fixed to the rotor 104 in the center of the rotor 104. Thus, a rotational force of the rotor 104 is transmitted to the rotating shaft 108, and thereby the rotor 104 and the rotating shaft 108 rotate together. The rotor 104 and the rotating shaft 108 may rotate in a one-way direction (e.g. in a clockwise direction).

In FIG. 1, a plurality of teeth 112 are formed on the inner surface of the stator 102. The plurality of teeth 112 are configured in such a manner that an inner wall of the stator 102 protrudes a predetermined length toward the rotor 104. The plurality of teeth 112 are all disposed at equal intervals. A space called a slot 114 is defined between the neighboring teeth 112. Coils 116 are wound around the plurality of teeth 112, respectively. The slots 114 serve as spaces for holding the coils 116 wound around the respective teeth 112. In the stator 102 illustrated in FIG. 1, nine teeth 112 and nine slots 114 are provided. The number of teeth 112 and the number of slots 114 are not limited to nine, and may be changed according to desired characteristics (e.g. the number of poles) of the motor.

A plurality of permanent magnets 110 are held in the rotor 104. The plurality of permanent magnets 110 may be radially held to be symmetrical with respect to the rotating shaft 108 and to face an outer circumferential surface of the rotor 104. In the rotor 104 of the motor according to an embodiment of the present disclosure, six pairs of permanent magnets 110 are held as illustrated in FIG. 1. The rotor 104 is formed with a plurality of cavities 208 (see FIG. 2) for holding the permanent magnets and a plurality of flux barriers 106. Here, each flux barrier 106 may be air. Further, the flux barriers 106 may be filled with a non-magnetic material. A structure of the rotor 104 will be described below in detail with reference to FIGS. 2 and 3.

Figure 2:
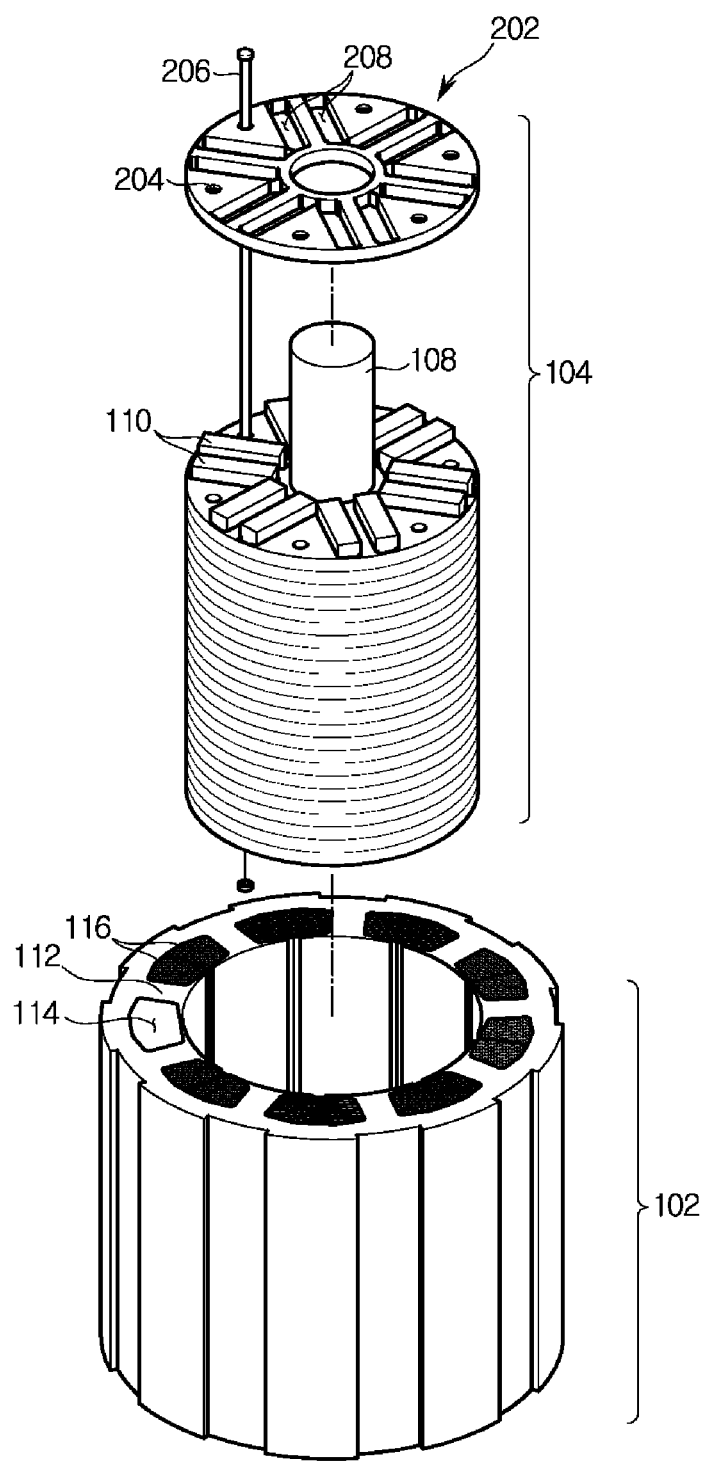
FIG. 2 is an exploded perspective view of the stator and rotor of the motor according to an embodiment of the present disclosure.

FIG. 2 is an exploded perspective view of the stator and rotor of the motor according to an embodiment of the present disclosure. As illustrated in FIG. 2, the rotor 104 is formed by stacking a plurality of rotor cores 202. Each of the plurality of rotor cores 202 is formed with the plurality of cavities 208 for holding the permanent magnets 110 and a plurality of rivet holes 204. When the plurality of rotor cores 202 are stacked in an aligned state, the spaces, i.e. the cavities 208, in which the permanent magnets 110 can be held are formed. Further, when the plurality of rotor cores 202 are stacked in an aligned state, spaces, i.e. the rivet holes 204, into which rivets 206 can be inserted are formed. When the rivets 206 are fastened after passing through the rivet holes 204, the plurality of rotor cores 202 can be mechanically coupled.

Figure 3:
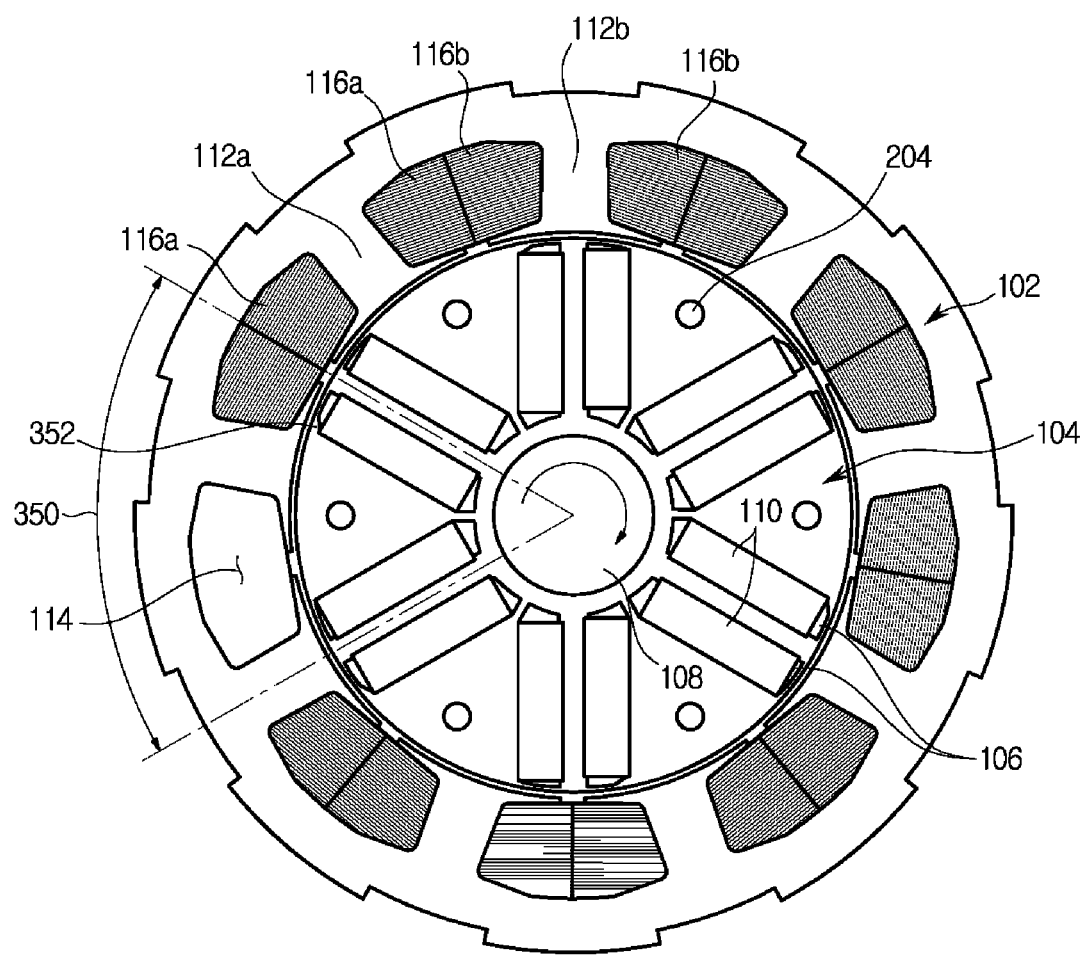
FIG. 3 is a top view of the stator and rotor of the motor according to an embodiment of the present disclosure.

FIG. 3 is a top view of the stator and rotor of the motor according to an embodiment of the present disclosure. As described above with reference to FIGS. 1 and 2, the coils 116 are wound around the nine teeth 112 formed at the stator 102. A structure in which the coils 116 are wound around the teeth 112 of the stator 102 will be described below using two neighboring teeth 112a and 112b as an example. That is, as illustrated in FIG. 3, when the coil 116a is wound around the tooth 112a, the wound coil 116a occupies the left- and right-hand spaces (slots) of the tooth 112a. Further, when the coil 116b is wound around the tooth 112b, the wound coil 116b occupies the left- and right-hand spaces (slots) of the tooth 112b.

The six pairs of, i.e. twelve, permanent magnets 110 are held in the rotor 104 in a radial shape to be symmetrical with respect to the rotating shaft 108 and to face the outer circumferential surface of the rotor 104. Because the plurality of permanent magnets held in the radial shape in this way have a spoke form, the concentrated flux type motor illustrated in FIGS. 1 to 3 is also referred to as a spoke type motor. A pair of permanent magnets 110 constitutes one pole. Thus, the motor illustrated in FIGS. 1 to 3 is a motor with a 6-pole rotor 104. A portion indicated by a reference numeral 350 in FIG. 3 denotes a portion corresponding to one pole at the stator 102 and the rotor 104. As can be seen from the portion indicated by the reference numeral 350, a pair of permanent magnets 110 has a "V" shape in which they are spread from the rotating shaft 108 toward an outer circumference of the rotor 104. The number of permanent magnets 110 is not limited to twelve (six pairs), and may be changed to realize desired characteristics (e.g. the number of poles) of the motor.

In the state in which the plurality of permanent magnets 110 are inserted into the rotor 104, the flux barriers 106 are formed at opposite ends of each permanent magnet 110. Further, a rib 352 is formed between the outer circumferential surface of the rotor 104 and the flux barriers 106. Shapes of the flux barriers and the rib in the motor are in close connection with generation of an electromagnetic excitation force, formation of a magnetic flux path, an increase/decrease in demagnetizing force, and so on. A method of minimizing demagnetization, i.e. maximizing the force resistant to the demagnetization, at the permanent magnet includes a method of increasing a thickness of the permanent magnet or a method of increasing a distance between the permanent magnet and the stator. The former may be responsible for an increase in cost of production of the motor because a larger permanent magnet is required, and the latter may be responsible for an increase in volume of the rotor (or the motor) because a wider space is required for disposition of the permanent magnet. In the motor according to the embodiment of the present disclosure, a structure of the rib of the rotor will be proposed to minimize demagnetization at the permanent magnets of the motor without increasing the sizes of the permanent magnets and the volume of the motor.

Figure 4:
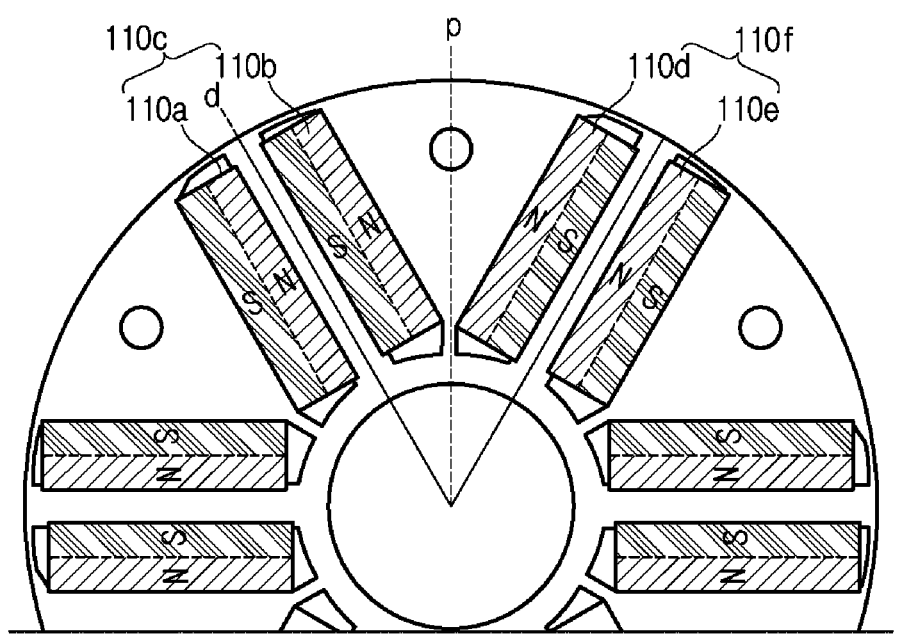
FIG. 4 is a view illustrating magnetization directions of the plurality of permanent magnets that are magnetized at the rotor of the motor according to an embodiment of the present disclosure.
Figure 5:
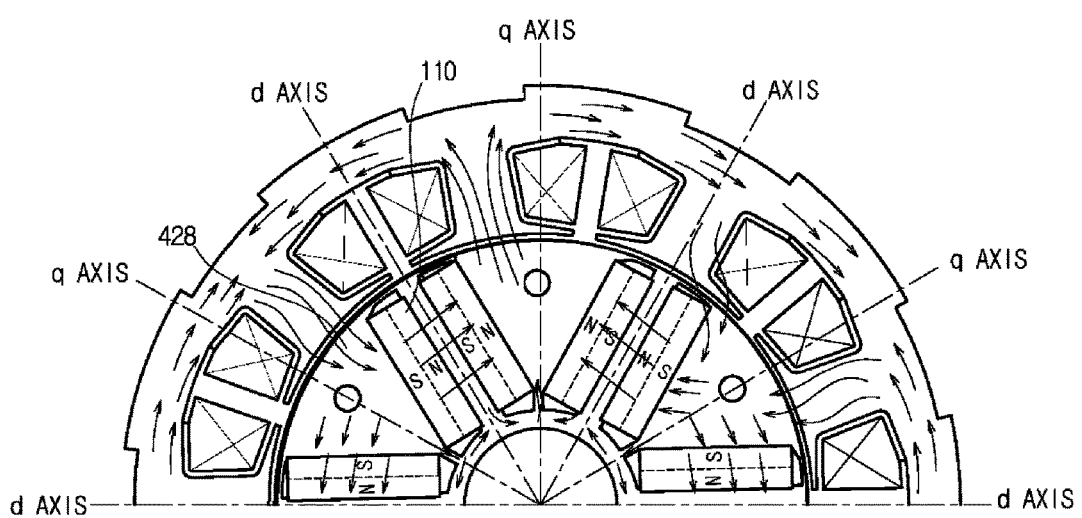
FIG. 5 is a view illustrating a concept of how magnetic flux of the plurality of permanent magnets is concentrated on a magnetic flux concentrating core.

FIGS. 4 and 5 are views illustrating magnetization and magnetic flux concentration of the plurality of permanent magnets. FIG. 4 is a view illustrating magnetization directions of the plurality of permanent magnets 110 at the rotor 104. FIG. 5 is a view illustrating a concept of how magnetic flux of the plurality of permanent magnets 110 is concentrated on a magnetic flux concentrating core 428.

The magnetization directions of the permanent magnets of FIG. 4 will be described in detail below. The plurality of permanent magnets 110 may be divided where two of them are opposite to each other across a d axis and two of them are opposite to each other across a q axis. The permanent magnets 110 that are opposite to each other across the q axis are magnetized to polarities (N and N poles or S and S poles) equal to each other, whereas the permanent magnets 110 that are opposite to each other across the d axis are magnetized to polarities (N and S poles or S and N poles) different from each other.

For example, assuming that a combination of first and second permanent magnets 110a and 110b adjacent to the d axis form a first permanent magnet combination 110c and that a combination of second and third permanent magnets 110b and 110d adjacent to the q axis form a second permanent magnet combination 110f, the second permanent magnet 110b of the second and third permanent magnets 110b and 110d adjacent to the q axis may be magnetized such that the S and N poles are sequentially arranged in a circumferential clockwise direction, and the third permanent magnet 110d may be magnetized such that the N and S poles are sequentially arranged in the circumferential clockwise direction. Further, the first and second permanent magnets 110a and 110b located at both sides of the d axis may be magnetized such that the S and N poles are sequentially arranged in the circumferential clockwise direction.

Figure 6:
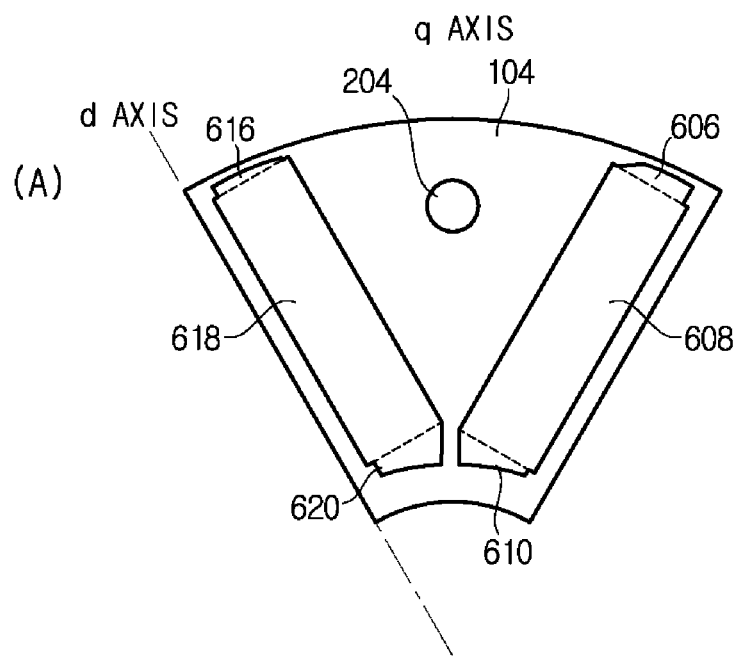
FIG. 6 is a view illustrating detailed shapes of the cavities and the flux barriers formed at the rotor of the motor according to an embodiment of the present disclosure.
Figure 6:
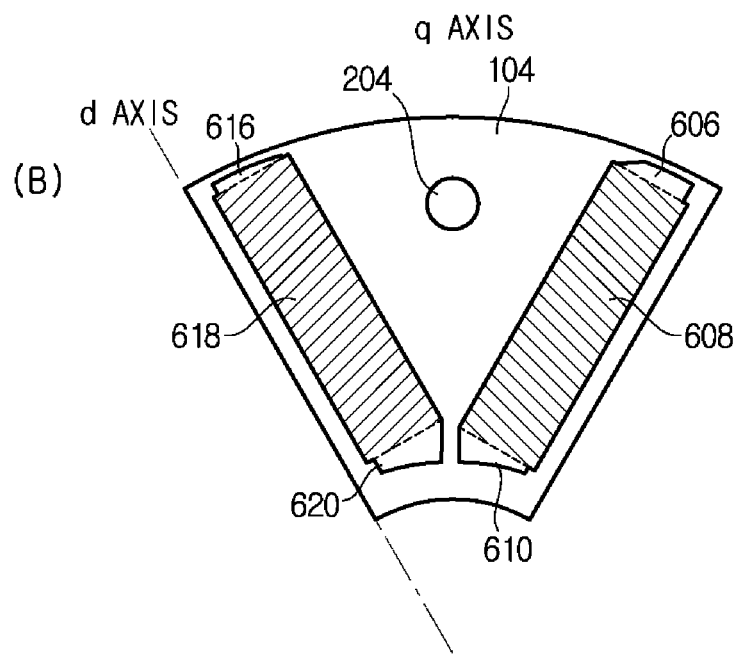

FIG. 6 is a view illustrating detailed shapes of the cavities and the flux barriers formed at the rotor of the motor according to an embodiment of the present disclosure. In detail, FIG. 6 illustrates a structure of a portion of the rotor 104 which is a circular sector 350 indicated by dashed dotted lines in FIG. 3, i.e. structures of a pair of permanent magnets constituting one pole and their surroundings. In FIG. 6, for detailed description of the cavities and the flux barriers, new reference numerals are given to the cavities and the flux barriers. In FIG. 6, the cavities and the flux barriers to which the new reference numerals are given include a first cavity 608, a second cavity 618, a first flux barrier 606, a second flux barrier 616, a third flux barrier 610, and a fourth flux barrier 620.

FIG. 6(A) illustrates a state in which the permanent magnets (e.g. 110 of FIG. 2) are not held in the cavities 608 and 618, and FIG. 6(B) illustrates a state in which the permanent magnets (e.g. 110 of FIG. 2) are held in the cavities 608 and 618. In FIG. 6(B), the held permanent magnets 110 are indicated by a hatching pattern.

As illustrated in FIG. 6(A), the first flux barrier 606, the first cavity 608, and the third flux barrier 610 are continuously formed on the right side of the q axis from the outer circumferential surface toward the central axis of the rotor 104. In FIG. 6(A), the first flux barrier 606, the first cavity 608, and the third flux barrier 610 are divided by dashed lines, which is a virtual division for distinguishing one another.

The second flux barrier 616, the second cavity 618, and the fourth flux barrier 620 are continuously formed on the left side of the q axis from the outer circumferential surface toward the central axis of the rotor 104. In FIG. 6(A), the second flux barrier 616, the second cavity 618, and the fourth flux barrier 620 are divided by dashed lines, which is a virtual division for distinguishing one another.

In the motor according to an embodiment of the present disclosure, two of the flux barriers formed on the left and right sides of the q axis have a structure in which shapes and positions thereof are asymmetrical. For example, the first flux barrier 606 and the second flux barrier 616 illustrated in FIG. 6(A) and FIG. 6(B) have a structure in which shapes and positions thereof are asymmetrical. This is in consideration of a rotational direction of the rotor 104. In the motor according to an embodiment of the present disclosure, the asymmetrical structure of the first flux barrier 606 and the second flux barrier 616 is set in view of the case in which the rotor rotates in the clockwise direction in the top view as illustrated in FIG. 3. This asymmetrical structure of the two flux barriers will be described below in detail with reference to FIG. 7.

Figure 7:
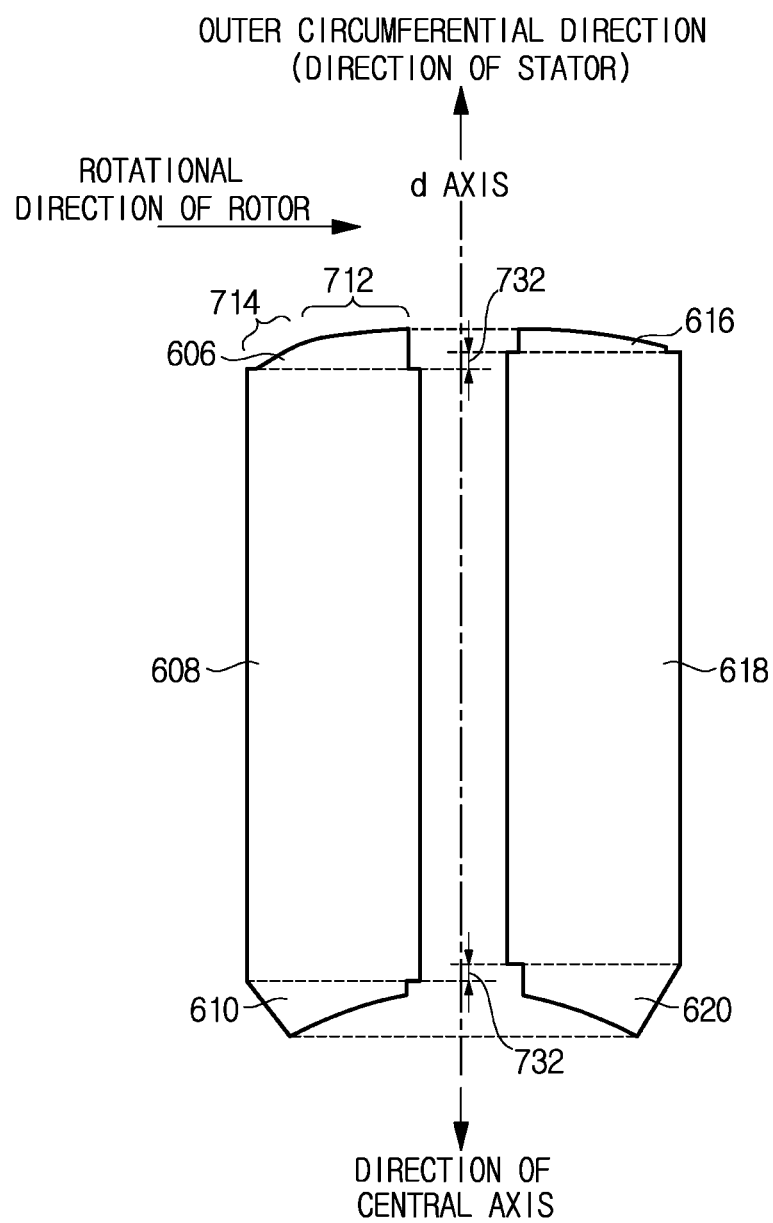
FIG. 7 is a view illustrating an asymmetrical structure of the pair of flux barriers illustrated in FIG. 6.

FIG. 7 is a view illustrating the asymmetrical structure of the pair of flux barriers illustrated in FIG. 6. To help understanding, the flux barriers and the cavities of the different poles adjacent to each other across the d axis are illustrated in FIG. 7. For example, the first flux barrier 606, the first cavity 608, and the third flux barrier 610 of FIG. 7 are elements constituting a part of a first pole, and the second flux barrier 616, the second cavity 618, and the fourth flux barrier 620 are elements constituting a part of a second pole adjacent to the first pole.

In FIG. 7, in comparison with positions of the first and second cavities 608 and 618 for holding the permanent magnets 110, the second cavity 618 is closer to the outer circumferential surface of the rotor 104 than the first cavity 608. Thus, there is a positional difference indicated by a reference numeral 732 along the d axis between the first cavity 608 and the second cavity 618. However, the first cavity 608 has the same length as the second cavity 618. The positional difference between the first cavity 608 and the second cavity 618 serves to make the positions of the permanent magnets 110 held in the first and second cavities 608 and 618 different. Due to the positional difference, it is possible to reduce demagnetization occurring at the permanent magnets.

The first flux barrier 606 connected to the first cavity 608 is formed long at one end of the first cavity 608 (at a terminal end facing the outer circumferential surface of the rotor 104) in a circumferential direction of the rotor 104 in such a manner that a width thereof is gradually reduced at a gentle angle and then at a relatively sharp angle. In other words, the first flux barrier 606 illustrated in FIG. 7 may have a wedge shape that is formed long in the circumferential direction of the rotor 104. In this wedge shape, a portion 712 of a boundary facing the stator 102 is gently inclined, and the other portion 714 is relatively sharply inclined. At the first flux barrier 606, the portion 712 having the gentle inclination is formed downstream in the rotational direction of the rotor 104, and the other portion 714 having the sharp inclination is formed upstream in the rotational direction of the rotor 104. That is, when the rotor 104 rotates, the portion 712 having the gentle inclination at the first flux barrier 606 is followed by the portion 714 having the sharp inclination.

The second flux barrier 616 connected to the second cavity 618 is formed long at one end of the second cavity 618 (at a terminal end facing the outer circumferential surface of the rotor 104) in a circumferential direction of the rotor 104 in such a manner that a width thereof is gradually reduced with a gentle curvature. In other words, the second flux barrier 616 may be configured such that an entire boundary facing the outer circumferential surface of the rotor 104 has a gentle curvature while the width is gradually reduced. At the second flux barrier 616, a portion whose width is narrow is formed downstream in the rotational direction of the rotor 104, and a portion whose width is wide is formed upstream in the rotational direction of the rotor 104. That is, when the rotor 104 rotates, the portion whose width is narrow at the second flux barrier 616 is followed by the portion whose width is wide.

The third flux barrier 610 and the fourth flux barrier 620 are formed long in a circumferential direction of the rotating shaft 108 at the other ends of the first cavity 608 and the second cavity 618 (at terminal ends facing the central axis of the rotor 104) in such a manner that a width of each of the third flux barrier 610 and the fourth flux barrier 620 becomes narrower in proportion to a distance from the d axis and becomes wider in reverse proportion to the distance from the d axis.

In the held permanent magnet motor in which the permanent magnets are held in the cavities, a rotational speed of the rotor can be increased up to allowable stress of each rib which depends on a material of the rotor. When the rotor rotates, a centrifugal force acts on the rotor, and can be structurally concentrated on the ribs of the rotor. The magnetic flux may leak out through the ribs. Especially, stacking a greater number of rotor cores to constitute the rotor results in a greater number of ribs, which may cause more magnetic flux to leak through the ribs. Because the leakage of the magnetic flux is just the demagnetization of the permanent magnet, the motor according to an embodiment of the present disclosure is configured to realize minimization of the demagnetization (i.e. improvement of the force resistant to the demagnetization) by the structures of the ribs.

Figure 8:
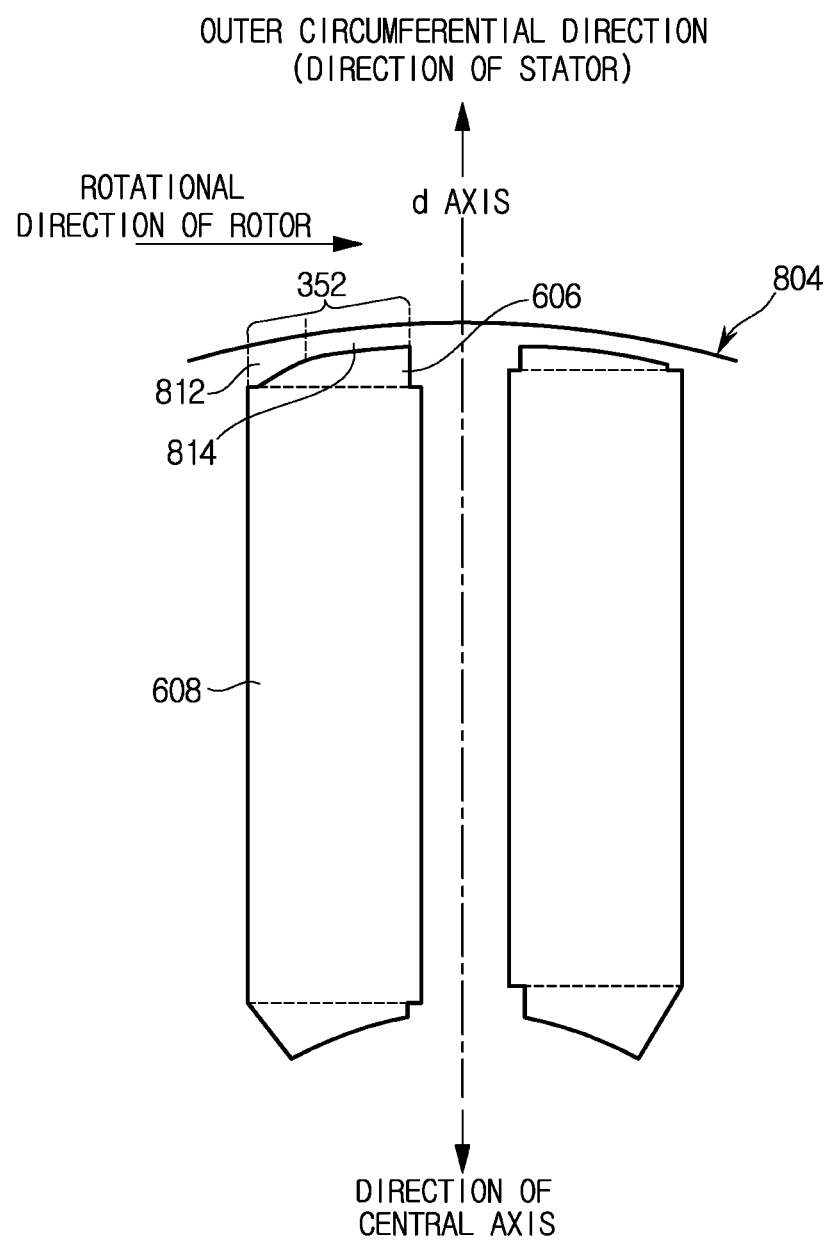
FIG. 8 is a view illustrating shapes of the ribs of the rotor in the motor according to an embodiment of the present disclosure.

FIG. 8 is a view illustrating shapes of the ribs of the rotor in the motor according to an embodiment of the present disclosure. Especially, the shape of the rib 352 adjacent to the first flux barrier 606 of the rotor 104 is illustrated in FIG. 8. As illustrated in FIG. 8, the rib 352 is formed between the first flux barrier 606 and an outer circumferential surface 804 of the rotor 104.

The rib 352 adjacent to the first flux barrier 606 is formed long in the rotational direction (the clockwise direction in FIG. 8) of the rotor 104. Further, the rib 352 is configured such that a width thereof is gradually reduced in the rotational direction of the rotor 104. That is, the width of the rib 352 is wider at an upstream side 812 in the rotational direction of the rotor 104, and is relatively narrower at a downstream side 814. The width of the rib 352 is wider at the upstream side 812 to induce the magnetic flux flowing to the permanent magnet 110 inserted into the first cavity 608 to flow to a side at which the width of the rib 352 is wide when the rotor 104 rotates. As illustrated in FIG. 5 above, when the magnetic flux flowing from the stator 102 to the rotor 104 flows to the permanent magnet 110 inserted into the first cavity 608, a corresponding demagnetizing force of the permanent magnet 110 is caused. Thus, as the magnetic flux flowing to the permanent magnet 110 decreases, the demagnetization is reduced at the permanent magnet 110. To this end, in the motor according to an embodiment of the present disclosure, the rib 352 is formed to be wider at the upstream side 812 such that the magnetic flux flowing from the stator 102 to the rotor 104 flows to the permanent magnet 110 of the first cavity 608 as little as possible. That is, the more magnetic flux flows to the upstream side 812 at which the width of the rib 352 is wide, and the magnetic flux flowing to the permanent magnet 110 of the first cavity 608 is reduced. Thereby, the demagnetizing force is reduced at the permanent magnet 110 (i.e. the force resistant to the demagnetization is increased).

The width of the rib 352 is relatively narrower at the downstream side 814 in order to sufficiently secure a size of the first flux barrier 606. If the width of the rib 352 is widened at the downstream side 814, it may be insufficient for the size of the first flux barrier 606 to control the flow of the magnetic flux to a desired level, and thus a magnetic flux control effect expected from the first flux barrier 606 may be reduced. Therefore, the width of the rib 352 may be formed wider at the upstream side 812 such that more magnetic flux can flow through the rib 352 and that the width of the rib 352 is formed relatively narrow at the downstream side 814 such that the size of the first flux barrier 606 is sufficiently secured.

Figure 9:
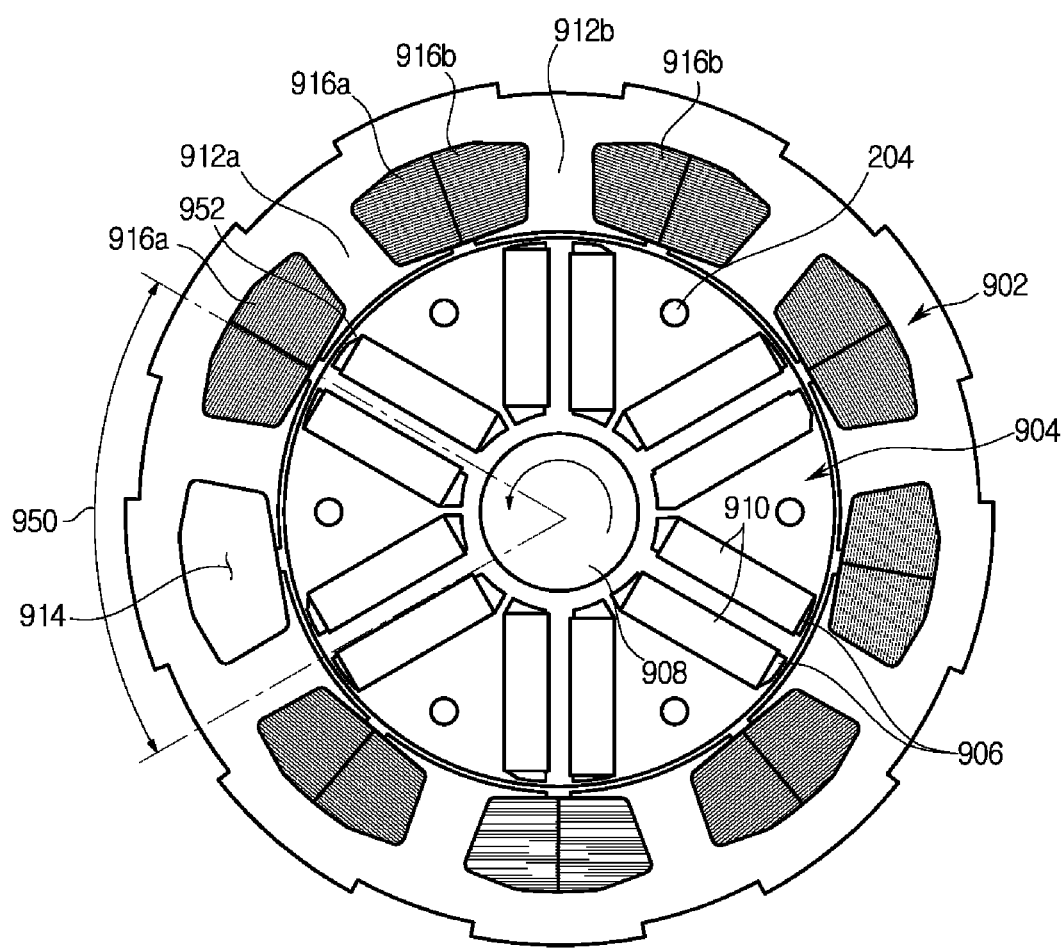
FIG. 9 is a top view of a stator and rotor of a motor according to an embodiment of the present disclosure.

FIG. 9 is a top view of a stator and rotor of a motor according to an embodiment of the present disclosure. The rotor may rotate in the single direction (the clockwise direction). However, the rotor 904 may rotate in a single direction (a counterclockwise direction). Coils 916 are wound around nine teeth 912 at a stator 902. A space called a slot 914 is defined between the neighboring teeth 912. A structure in which the coils 916 are wound around the teeth 912 of the stator 902 will be described below using the two neighboring teeth 912a and 912b as an example. That is, as illustrated in FIG. 9, when the coil 916a is wound around the tooth 912a, the wound coil 916a occupies the left- and right-hand spaces (slots) of the tooth 912a. Further, when the coil 916b is wound around the tooth 912b, the wound coil 916b occupies the left- and right-hand spaces (slots) of the tooth 912b.

Six pairs of, i.e. twelve, permanent magnets 910 are held in the rotor 904 in a radial shape to be symmetrical with respect to a rotating shaft 908 and to face an outer circumferential surface of the rotor 904. Because the plurality of permanent magnets held in the radial shape in this way have a spoke form, the concentrated flux type motor illustrated in FIG. 9 is referred to as a spoke type motor. A pair of permanent magnets 910 constitutes one pole. Thus, the motor illustrated in FIG. 9 is a motor with a 6-pole rotor 904. A portion indicated by a reference numeral 950 in FIG. 9 denotes a portion corresponding to one pole at the stator 902 and the rotor 904. As can be seen from the portion indicated by the reference numeral 950, a pair of permanent magnets 910 has a "V" shape in which they are spread from the rotating shaft 908 toward an outer circumference of the rotor 904. The number of permanent magnets 910 is not limited to twelve (six pairs), and may be changed to realize desired characteristics (e.g. the number of poles) of the motor.

In the state in which the plurality of permanent magnets 910 are inserted into the rotor 904, flux barriers 906 are formed at opposite ends of each permanent magnet 910. Further, ribs 952 are formed between the outer circumferential surface of the rotor 904 and the flux barriers 906. Shapes of the flux barriers and the ribs in the motor are in close connection with generation of an electromagnetic excitation force, formation of a magnetic flux path, an increase/decrease in demagnetizing force, and so on. A method of minimizing demagnetization, i.e. maximizing a force resistant to the demagnetization, at the permanent magnet includes a method of increasing a thickness of the permanent magnet or a method of increasing a distance between the permanent magnet and the stator. The former may be responsible for an increase in cost of production of the motor because a larger permanent magnet is required, and the latter may be responsible for an increase in volume of the rotor (or the motor) because a wider space is required for disposition of the permanent magnet. In the motor according to the embodiment of the present disclosure, a structure of each rib of the rotor is proposed to minimize the demagnetization of the motor without increasing a size of the permanent magnet and a volume of the motor.

Figure 10:
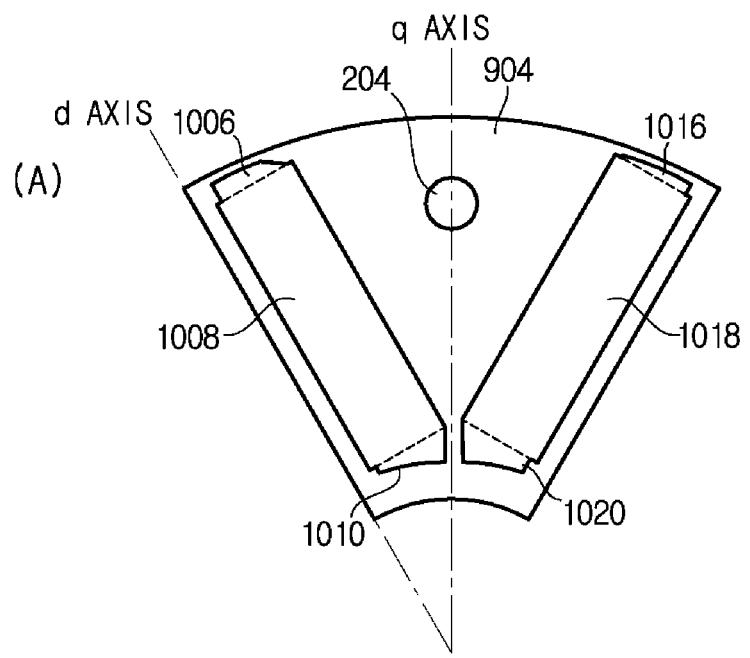
FIG. 10 is a view illustrating detailed shapes of cavities and flux barriers formed at the rotor of the motor according to an embodiment of the present disclosure.
Figure 10:
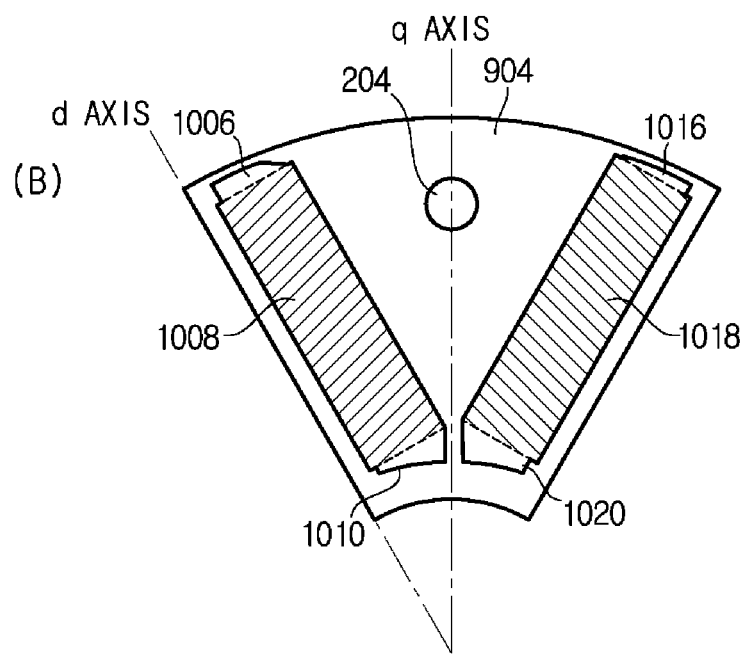

FIG. 10 is a view illustrating detailed shapes of the cavities and the flux barriers formed at the rotor of the motor according to an embodiment of the present disclosure. In detail, FIG. 10 illustrates a structure of a portion of the rotor 904 which is a circular sector 950 indicated by dashed dotted lines in FIG. 9, i.e. structures of a pair of permanent magnets constituting one pole and their surroundings. In FIG. 10, for detailed description of the cavities and the flux barriers, new reference numerals are given to the cavities and the flux barriers. In FIG. 10, the cavities and the flux barriers to which the new reference numerals are given include a first cavity 1008, a second cavity 1018, a first flux barrier 1006, a second flux barrier 1016, a third flux barrier 1010, and a fourth flux barrier 1020.

FIG. 10(A) illustrates a state in which the permanent magnets 910 are not held in the cavities 1008 and 1018, and FIG. 10(B) illustrates a state in which the permanent magnets 910 are held in the cavities 1008 and 1018. In FIG. 10(B), the held permanent magnets 910 are indicated by hatching.

As illustrated in FIG. 10(A), the first flux barrier 1006, the first cavity 1008, and the third flux barrier 1010 are continuously formed on the left side of the q axis from the outer circumferential surface toward the central axis of the rotor 904. In FIG. 10(A), the first flux barrier 1006, the first cavity 1008, and the third flux barrier 1010 are divided by dashed lines, which is a virtual division for distinguishing one another.

The second flux barrier 1016, the second cavity 1018, and the fourth flux barrier 1020 are continuously formed on the right side of the q axis from the outer circumferential surface toward the central axis of the rotor 904. In FIG. 10(A), the second flux barrier 1016, the second cavity 1018, and the fourth flux barrier 1020 are divided by dashed lines, which is a virtual division for distinguishing one another.

In the motor according to an embodiment of the present disclosure, two of the flux barriers formed on the left and right sides of the q axis have a structure in which shapes and positions thereof are asymmetrical. For example, the first flux barrier 1006 and the second flux barrier 1016 illustrated in FIG. 10(A) and FIG. 10(B) have a structure in which shapes and positions thereof are asymmetrical. This is in consideration of a rotational direction of the rotor 904. In the motor according to an embodiment of the present disclosure, the asymmetrical structure of the first flux barrier 1006 and the second flux barrier 1016 is set in view of the condition that the rotor rotates in the counterclockwise direction in the top view as illustrated in FIG. 9. This asymmetrical structure of the two flux barriers will be described below in detail with reference to FIG. 11.

Figure 11:
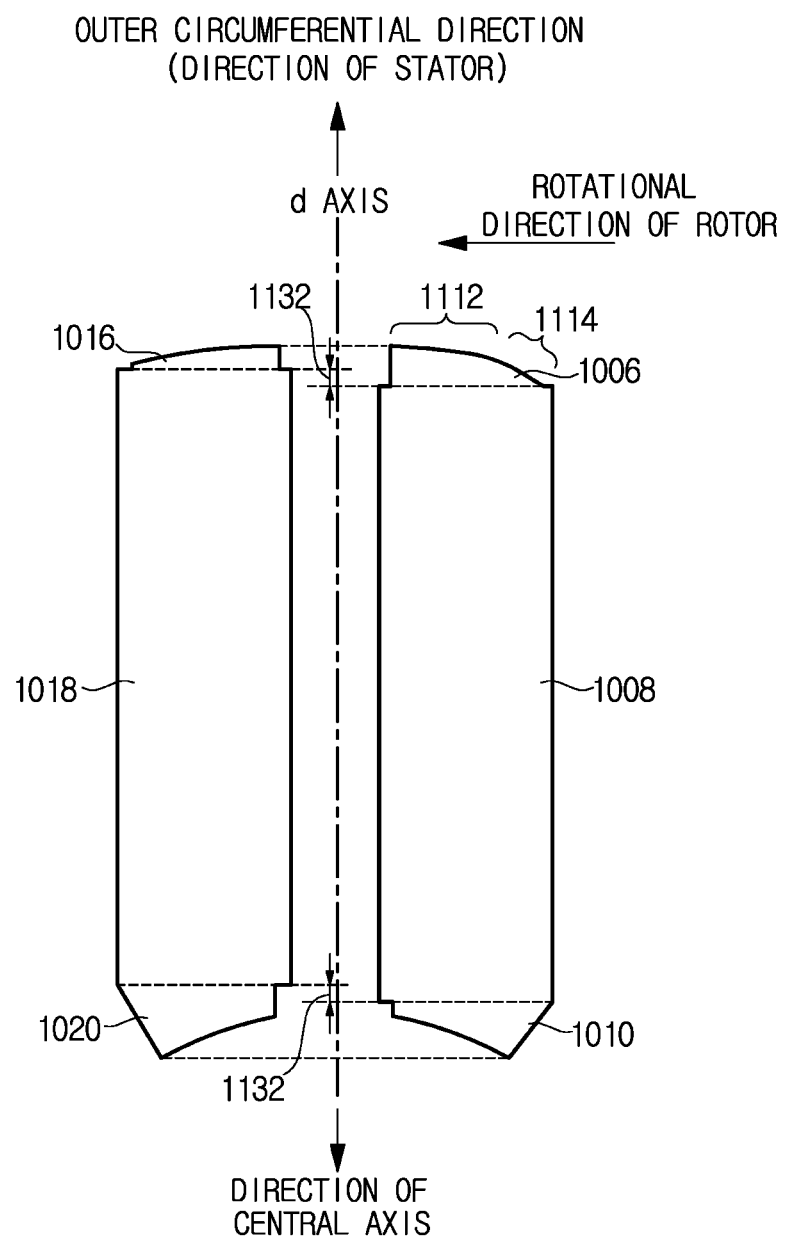
FIG. 11 is a view illustrating an asymmetrical structure of the pair of flux barriers illustrated in FIG. 10.

FIG. 11 is a view illustrating the asymmetrical structure of the pair of flux barriers illustrated in FIG. 10. To help understanding, the flux barriers and the cavities of the different poles adjacent to each other across the d axis are illustrated in FIG. 11. For example, the first flux barrier 1006, the first cavity 1008, and the third flux barrier 1010 of FIG. 11 are elements constituting a part of a first pole, and the second flux barrier 1016, the second cavity 1018, and the fourth flux barrier 1020 are elements constituting a part of a second pole adjacent to the first pole.

In FIG. 11, in comparison with positions of the first and second cavities 1008 and 1018 for holding the permanent magnets 910, the second cavity 1018 is closer to the outer circumferential surface of the rotor 904 than the first cavity 1008. Thus, there is a positional difference indicated by a reference numeral 1132 along the d axis between the first cavity 1008 and the second cavity 1018. However, the first cavity 1008 has the same length as the second cavity 1018. The positional difference between the first cavity 1008 and the second cavity 1118 serves to make the positions of the permanent magnets 910 held (inserted) in the first and second cavities 1008 and 1018 different. Due to the positional difference, it is possible to reduce demagnetization occurring at the permanent magnets 910.

The first flux barrier 1006 connected to the first cavity 1008 is formed long in a circumferential direction of the rotor 904 at one end of the first cavity 1008 (at a terminal end directed to the outer circumferential surface of the rotor 904) in such a manner that a width thereof is gradually reduced at a gentle angle and then at a relatively sharp angle. In other words, the first flux barrier 1006 illustrated in FIG. 11 may have a wedge shape that is formed long in the circumferential direction of the rotor 904. In this wedge shape, a portion 1112 of a boundary facing the stator 902 is gently inclined, and the other portion 1114 is relatively sharply inclined. At the first flux barrier 1006, the portion 1112 having the gentle inclination is formed downstream in the rotational direction of the rotor 904, and the other portion 1114 having the sharp inclination is formed upstream in the rotational direction of the rotor 904. That is, when the rotor 904 rotates, the portion 1112 having the gentle inclination at the first flux barrier 1006 is followed by the portion 1114 having the sharp inclination.

The second flux barrier 1016 connected to the second cavity 1018 is formed long in a circumferential direction of the rotor 904 at one end of the second cavity 1018 (at a terminal end facing the outer circumferential surface of the rotor 904) in such a manner that a width thereof is gradually reduced with a gentle curvature. In other words, the second flux barrier 1016 may be configured such that an entire boundary facing the stator 902 has a gentle curvature while the width is gradually reduced. At the second flux barrier 1016, a portion whose width is narrow is formed downstream in the rotational direction of the rotor 904, and a portion whose width is wide is formed upstream in the rotational direction of the rotor 904. That is, when the rotor 904 rotates, the portion whose width is narrow at the second flux barrier 1016 is followed by the portion whose width is wide.

The third flux barrier 1010 and the fourth flux barrier 1020 are formed long in a circumferential direction of the rotating shaft 908 at the other ends of the first cavity 1008 and the second cavity 1018 (at terminal ends facing the central axis of the rotor 904) in such a manner that a width of each of the third flux barrier 1010 and the fourth flux barrier 1020 becomes narrower in proportion to a distance from the d axis and becomes wider in reverse proportion to the distance from the d axis.

In the held permanent magnet motor in which the permanent magnets are held in the cavities, a rotational speed of the rotor can be increased up to allowable stress of each rib which depends on a material of the rotor. When the rotor rotates, a centrifugal force acts on the rotor, and can be structurally concentrated on the ribs of the rotor. The magnetic flux may leak out through the ribs. Especially, stacking a greater number of rotor cores to constitute the rotor results in a greater number of ribs, which may cause more magnetic flux to leak through the ribs. Because the leakage of the magnetic flux is just the demagnetization of the permanent magnet, the motor according to an embodiment of the present disclosure is configured to realize minimization of the demagnetization (i.e. improvement of the force resistant to the demagnetization) by the structures of the ribs.

Figure 12:
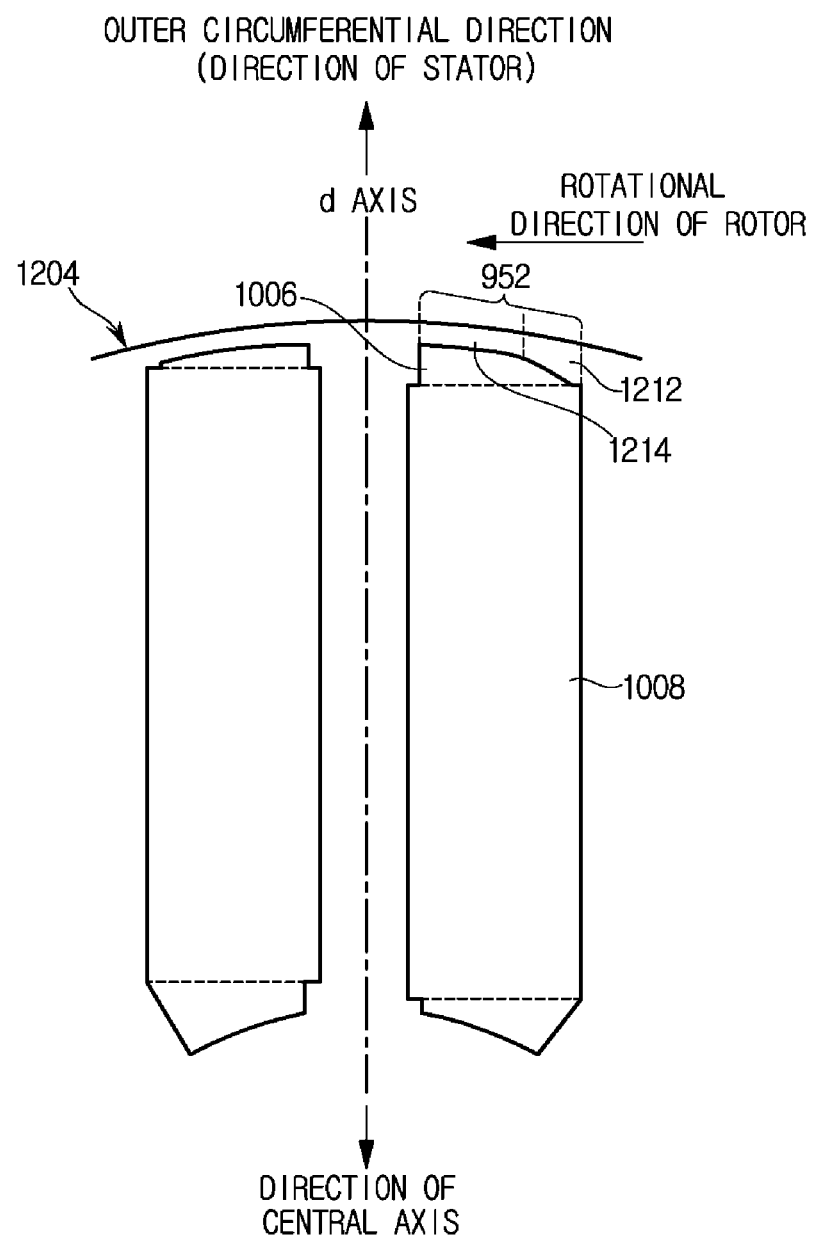
FIG. 12 is a view illustrating shapes of the ribs of the rotor in the motor according to an embodiment of the present disclosure.

FIG. 12 is a view illustrating shapes of the ribs of the rotor in the motor according to an embodiment of the present disclosure. Especially, the shape of the rib 952 adjacent to the first flux barrier 1006 of the rotor 904 is illustrated in FIG. 12. As illustrated in FIG. 12, the rib 952 is formed between the first flux barrier 1006 and an outer circumferential surface 1204 of the rotor 904.

The rib 952 adjacent to the first flux barrier 1006 is formed long in the rotational direction (the counterclockwise direction in FIG. 12) of the rotor 904. Further, the rib 952 is configured such that a width thereof is gradually reduced in the rotational direction of the rotor 904. That is, the width of the rib 952 is wider at an upstream side 1212 in the rotational direction of the rotor 904, and is relatively narrower at a downstream side 1214. The width of the rib 952 is wider at the upstream side 1212 to induce the magnetic flux flowing to the permanent magnet 910 inserted into the first cavity 1008 to flow to a side at which the width of the rib 952 is wide when the rotor 904 rotates. As illustrated in FIG. 5 above, it can be found that the magnetic flux flowing from the stator 902 to the rotor 904 flows to the permanent magnet 910 inserted into the first cavity 1008. The magnetic flux flowing to the permanent magnet inserted into the first cavity 1008 causes a demagnetizing force of the permanent magnet 910. Thus, as the magnetic flux flowing to the permanent magnet 910 decreases, the demagnetization of the permanent magnet 910 can be reduced. To this end, in the motor according to the embodiment of the present disclosure, the rib 952 is formed to be wider at the upstream side 1212 such that the magnetic flux flowing from the stator 902 to the rotor 904 flows to the permanent magnet 910 of the first cavity 1008 as little as possible. That is, the more magnetic flux flows to the upstream side 1212 at which the width of the rib 952 is wide, and the magnetic flux flowing to the permanent magnet 910 of the first cavity 1008 is reduced. Thereby, the demagnetizing force is reduced at the permanent magnet 910 (i.e. the force resistant to the demagnetization is increased).

The width of the rib 952 is relatively narrower at the downstream side 1214 in order to sufficiently secure a size of the first flux barrier 1006. If the width of the rib 952 is widened at the downstream side 1214, it may be insufficient for the size of the first flux barrier 1006 to control the flow of the magnetic flux to a desired level, and thus a magnetic flux control effect expected from the first flux barrier 1006 may be reduced. Therefore, the width of the rib 952 may be formed wide at the upstream side 1212 such that more magnetic flux can flow through the rib 952 and that the width of the rib 952 is formed relatively narrow at the downstream side 1214 such that the size of the first flux barrier 1006 is sufficiently secured.

Figure 13:
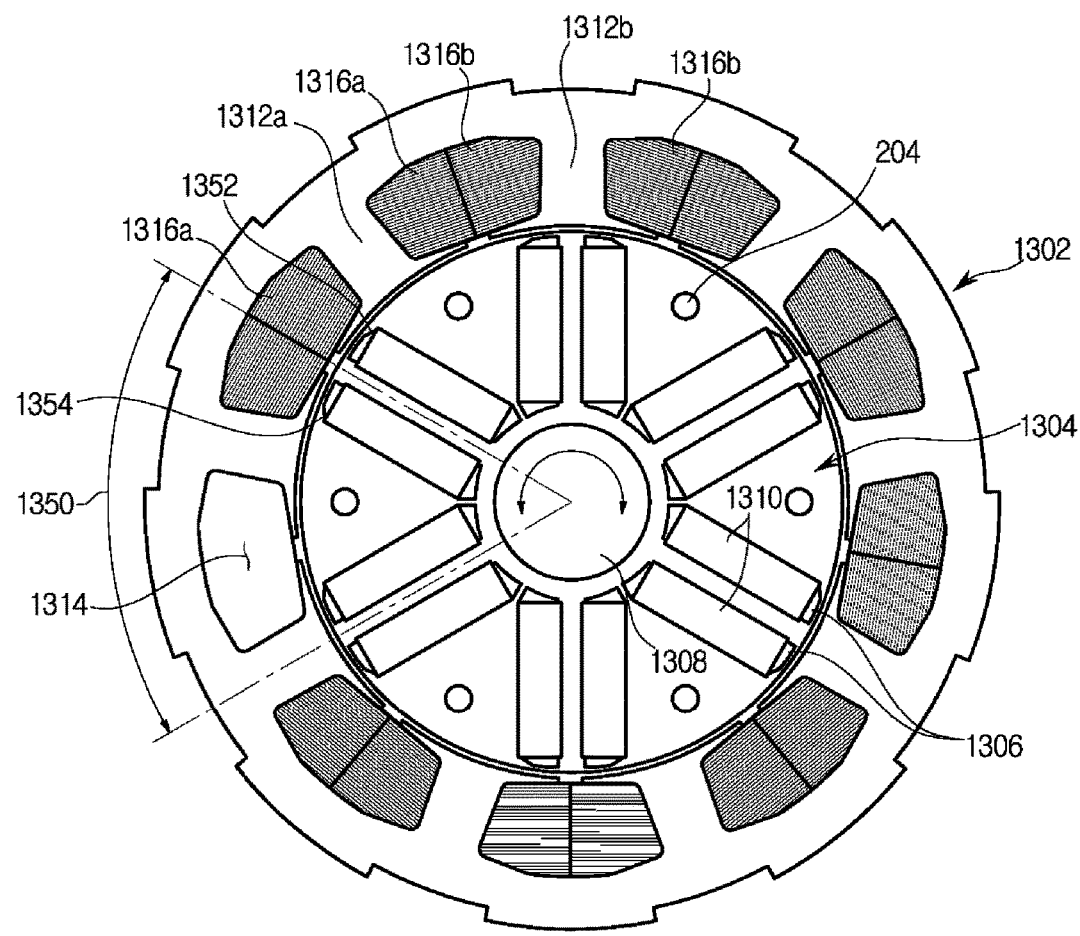
FIG. 13 is a top view of a stator and rotor of a motor according to an embodiment of the present disclosure.

FIG. 13 is a top view of a stator and rotor of a motor according to an embodiment of the present disclosure. The rotor may rotate in the single direction (any one of the clockwise and counterclockwise directions). However, a rotor 1304 may be rotatable in both directions (clockwise and counterclockwise directions). Coils 1316 are wound around nine teeth 1312 at a stator 1302. A space called a slot 1314 is defined between the neighboring teeth 1312. A structure in which the coils 1316 are wound around the teeth 1312 of the stator 1302 will be described below using the two neighboring teeth 1312*a* and 1312*b* as an example. That is, as illustrated in FIG. 13, when the coil 1316*a* is wound around the tooth 1312*a*, the wound coil 1316*a* occupies the left- and right-hand spaces (slots) of the tooth 1312*a*. Further, when the coil 1316*b* is wound around the tooth 1312*b*, the wound coil 1316*b* occupies the left- and right-hand spaces of the tooth 1312*b*.

Six pairs of, i.e. twelve, permanent magnets 1310 are held in the rotor 1304 in a radial shape to be symmetrical with respect to a rotating shaft 1308 and to face an outer circumferential surface of the rotor 1304. Because the plurality of permanent magnets held in the radial shape in this way have a spoke form, the concentrated flux type motor illustrated in FIG. 13 is referred to as a spoke type motor.

A pair of permanent magnets 1310 constitutes one pole. Thus, the motor illustrated in FIG. 13 is a motor with a 6-pole rotor 1304. A portion indicated by a reference numeral 1350 in FIG. 13 denotes a portion corresponding to one pole at the stator 1302 and the rotor 1304. As can be seen from the portion indicated by the reference numeral 1350, a pair of permanent magnets 1310 has a "V" shape in which they are spread from the rotating shaft 1308 toward an outer circumference of the rotor 1304. The number of permanent magnets 1310 is not limited to twelve (six pairs), and may be changed to realize desired characteristics (e.g. the number of poles) of the motor.

In the state in which the permanent magnets 1310 of the rotor 1304 are inserted, flux barriers 1306 are formed at opposite ends of each permanent magnet 1310. Further, ribs 1352 and 1354 are formed between the outer circumferential surface of the rotor 1304 and the flux barriers 1306. Shapes of the flux barriers and the ribs in the motor are in close connection with generation of an electromagnetic excitation force, formation of a magnetic flux path, an increase/decrease in demagnetizing force, and so on. A method of minimizing demagnetization, i.e. maximizing a force resistant to the demagnetization, at the permanent magnet includes a method of increasing a thickness of the permanent magnet or a method of increasing a distance between the permanent magnet and the stator. The former may be responsible for an increase in cost of production of the motor because a larger permanent magnet is required, and the latter may be responsible for an increase in volume of the rotor (or the motor) because a wider space is required for disposition of the permanent magnet. In the motor according to the embodiment of the present disclosure, a structure of each rib of the rotor is proposed to minimize the demagnetization of the motor without increasing a size of the permanent magnet and a volume of the motor.

Figure 14:
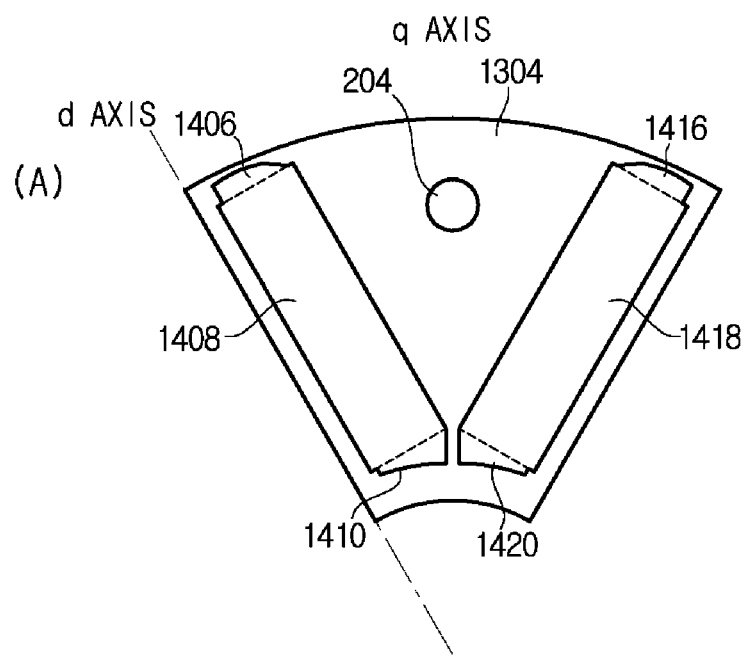
FIG. 14 is a view illustrating detailed shapes of cavities and flux barriers formed at the rotor of the motor according to an embodiment of the present disclosure.
Figure 14:
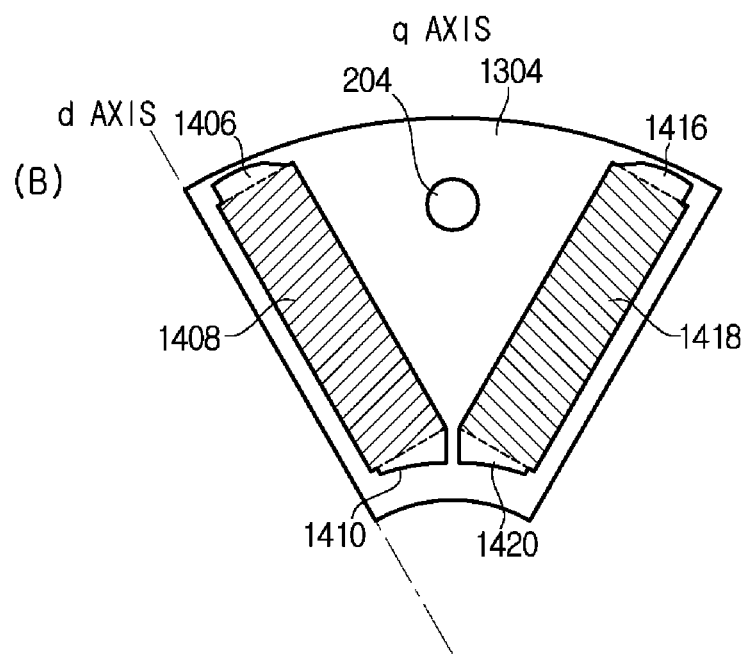

FIG. 14 is a view illustrating detailed shapes of the cavities and the flux barriers formed at the rotor of the motor according to an embodiment of the present disclosure. In detail, FIG. 14 illustrates a structure of a portion of the rotor 1304 which is a circular sector 1350 indicated by dashed dotted lines in FIG. 13, i.e. structures of a pair of permanent magnets constituting one pole and their surroundings. In FIG. 14, for detailed description of the cavities and the flux barriers, new reference numerals are given to the cavities and the flux barriers. In FIG. 14, the cavities and the flux barriers to which the new reference numerals are given include a first cavity 1408, a second cavity 1418, a first flux barrier 1406, a second flux barrier 1416, a third flux barrier 1410, and a fourth flux barrier 1420.

FIG. 14(A) illustrates a state in which the permanent magnets 1310 are not held in the cavities 1408 and 1418, and FIG. 14(B) illustrates a state in which the permanent magnets 1310 are held in the cavities 1408 and 1418. In FIG. 14(B), the held permanent magnets 1310 are indicated by hatching.

As illustrated in FIG. 14(A), the first flux barrier 1406, the first cavity 1408, and the third flux barrier 1410 are continuously formed on the left side of the q axis from an outer side toward a central portion (i.e. from the outer circumference toward the central axis) of the rotor 1304. In FIG. 14(A), the first flux barrier 1406, the first cavity 1408, and the third flux barrier 1410 are divided by dashed lines, which is a virtual division for distinguishing one another.

The second flux barrier 1416, the second cavity 1418, and the fourth flux barrier 1420 are continuously formed on the right side of the q axis from the outer side toward the central portion (i.e. from the outer circumference toward the central axis) of the rotor 1304. In FIG. 14(A), the second flux barrier 1416, the second cavity 1418, and the fourth flux barrier 1420 are divided by dashed lines, which is a virtual division for distinguishing one another.

In the motor according to an embodiment of the present disclosure, two of the flux barriers formed on the left and right sides of the q axis have a structure in which shapes and positions thereof are symmetrical. For example, the first flux barrier 1406 and the second flux barrier 1416 illustrated in FIG. 14(A) and FIG. 14(B) have a structure in which shapes and positions thereof are symmetrical. This is in consideration of a rotational direction of the rotor 1304. In the motor according to an embodiment of the present disclosure, the first flux barrier 1406 and the second flux barrier 1416 are configured to have the symmetrical structure in view of the condition that the rotor rotates in both the clockwise and counterclockwise directions in the top view as illustrated in FIG. 13. This symmetrical structure of the two flux barriers will be described below in detail with reference to FIG. 15.

Figure 15:
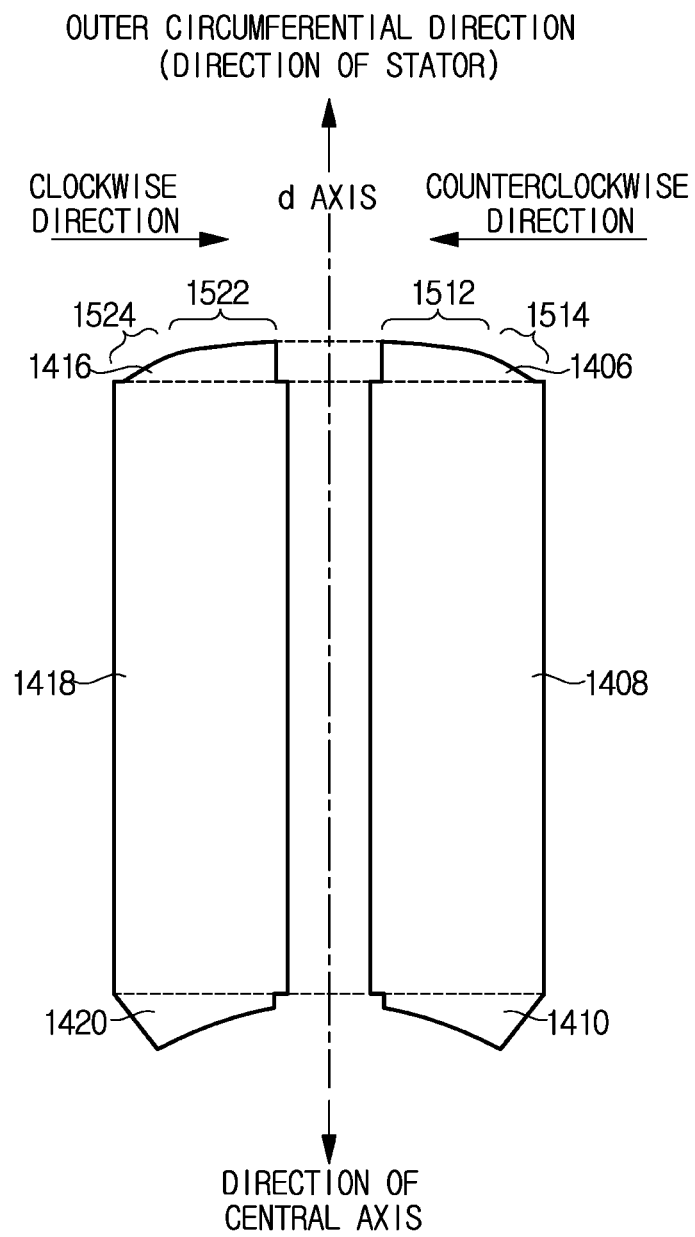
FIG. 15 is a view illustrating a symmetrical structure of the pair of flux barriers illustrated in FIG. 14.

FIG. 15 is a view illustrating the symmetrical structure of the pair of flux barriers illustrated in FIG. 14. To help understanding, the flux barriers and the cavities of the different poles adjacent to each other across the d axis are illustrated in FIG. 15. For example, the first flux barrier 1406, the first cavity 1408, and the third flux barrier 1410 of FIG. 14 are elements constituting a part of a first pole, and the second flux barrier 1416, the second cavity 1418, and the fourth flux barrier 1420 are elements constituting a part of a second pole adjacent to the first pole.

In FIG. 13, in comparison with positions of the first and second cavities 1408 and 1418 for holding the permanent magnets 1310, the first and second cavities 1408 and 1418 are formed at the same position and length from the center of the rotor 1304. In the motor according to an embodiment of the prevent disclosure, the first and second cavities 1408 and 1418 are formed at the same position and length from the center of the rotor 1304, which is in consideration of the bidirectional (clockwise and counterclockwise) rotation of the motor according to an embodiment of the prevent disclosure.

The first flux barrier 1406 connected to the first cavity 1408 is formed long in a circumferential direction of the rotor 1304 at one end of the first cavity 1008 (at a terminal end facing the outer circumferential surface of the rotor 1304) in such a manner that a width thereof is gradually reduced at a gentle angle and then at a relatively sharp angle. In other words, the first flux barrier 1406 illustrated in FIG. 15 may have a wedge shape that is formed long in the circumferential direction of the rotor 1304. In this wedge shape, a portion 1512 of a boundary directed to the stator 1302 is gently inclined, and the other portion 1514 is relatively sharply inclined. At the first flux barrier 1406, the portion 1512 having the gentle inclination is formed downstream in the rotational direction (counterclockwise direction) of the rotor 1304, and the other portion 1514 having the sharp inclination is formed upstream in the rotational direction (counterclockwise direction) of the rotor 1304. That is, when the rotor 1304 rotates, the portion 1512 having the gentle inclination at the first flux barrier 1406 is followed by the portion 1514 having the sharp inclination.

The second flux barrier 1416 connected to the second cavity 1418 is formed long in a circumferential direction of the rotor 1304 at one end of the second cavity 1418 (at a terminal end facing the outer circumferential surface of the rotor 1304) in such a manner that a width thereof is gradually reduced at a gentle angle and then at a relatively sharp angle. In other words, the second flux barrier 1416 illustrated in FIG. 15 may have a wedge shape that is formed long in the circumferential direction of the rotor 1304. In this wedge shape, a portion 1522 of a boundary facing the stator 1302 is gently inclined, and the other portion 1524 is relatively sharply inclined. At the second flux barrier 1416, the portion 1522 having the gentle inclination is formed downstream in the rotational direction (clockwise direction) of the rotor 1304, and the other portion 1524 having the sharp inclination is formed upstream in the rotational direction (clockwise direction) of the rotor 1304. That is, when the rotor 1304 rotates, the portion 1522 having the gentle inclination at the second flux barrier 1416 is followed by the portion 1524 having the sharp inclination.

The third flux barrier 1410 and the fourth flux barrier 1420 are formed long in a circumferential direction of the rotating shaft 1308 at the other ends of the first cavity 1408 and the second cavity 1418 (at terminal ends facing the central axis of the rotor 1304) in such a manner that a width of each of the third flux barrier 1410 and the fourth flux barrier 1420 becomes narrower in proportion to a distance from the d axis and becomes wider in reverse proportion to the distance from the d axis.

In the held permanent magnet motor in which the permanent magnets are held in the cavities, a rotational speed of the rotor can be increased up to allowable stress of each rib which depends on a material of the rotor. When the rotor rotates, a centrifugal force acts on the rotor, and can be structurally concentrated on the ribs of the rotor. The magnetic flux may leak out through the ribs. Especially, stacking a greater number of rotor cores to constitute the rotor results in a greater number of ribs, which may cause more magnetic flux to leak through the ribs. Because the leakage of the magnetic flux is just the demagnetization of the permanent magnet, the motor according to an embodiment of the present disclosure is configured to realize minimization of the demagnetization (i.e. improvement of the force resistant to the demagnetization) by the structures of the ribs.

Figure 16:
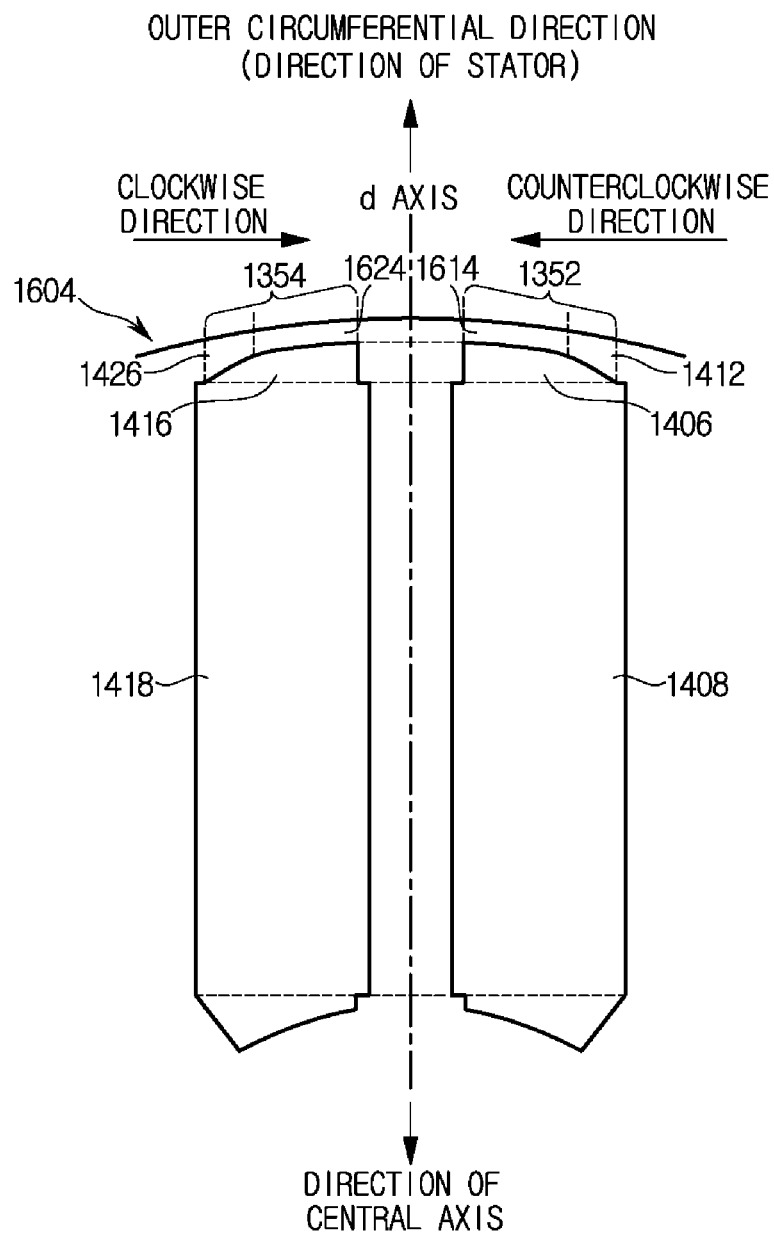
FIG. 16 is a view illustrating shapes of the ribs of the rotor in the motor according to an embodiment of the present disclosure.

FIG. 16 is a view illustrating shapes of the ribs of the rotor in the motor according to an embodiment of the present disclosure. Especially, the shapes of the first and second ribs 1352 and 1354 adjacent to the first and second flux barriers 1406 and 1416 of the rotor 1304 are illustrated in FIG. 16. As illustrated in FIG. 16, the first rib 1352 is formed between the first flux barrier 1406 and an outer circumferential surface 1604 of the rotor 1304, and the second rib 1354 is formed between the second flux barrier 1416 and the outer circumferential surface 1604 of the rotor 1304. The first rib 1352 and the second rib 1354 are symmetrical with respect to the d axis. The shape of the first rib 1352 is in consideration of when the rotor 1304 rotates in the counterclockwise direction, and the shape of the second rib 1354 is in consideration of when the rotor 1304 rotates in the clockwise direction.

The first rib 1352 adjacent to the first flux barrier 1406 is formed long in the rotational direction (the clockwise or counterclockwise direction) of the rotor 1304. Further, the first rib 1352 is configured such that a width thereof is gradually reduced in the rotational direction of the rotor 1304. That is, the width of the first rib 1352 is wider at an upstream side 1612 in the rotational direction of the rotor 1304, and is relatively narrower at a downstream side 1614. The width of the first rib 1352 is wider at the upstream side 1612 to induce the magnetic flux flowing to the permanent magnet 1310 inserted into the first cavity 1408 to flow to a side at which the width of the first rib 1352 is wide when the rotor 1304 rotates. As illustrated in FIG. 5 above, it can be found that the magnetic flux flowing from the stator 1302 to the rotor 1304 flows to the permanent magnet 1310 inserted into the first cavity 1408. The magnetic flux flowing to the permanent magnet inserted into the first cavity 1408 causes a demagnetizing force of the permanent magnet 1310. Thus, as the magnetic flux flowing to the permanent magnet 1310 decreases, the demagnetization of the permanent magnet 1310 can be reduced. To this end, in the motor according to the embodiment of the present disclosure, the first rib 1352 is formed to be wider at the upstream side 1612 such that the magnetic flux flowing from the stator 1302 to the rotor 1304 flows to the permanent magnet 1310 of the first cavity 1408 as little as possible. That is, the more magnetic flux flows to the upstream side 1612 at which the width of the first rib 1352 is wide, and the magnetic flux flowing to the permanent magnet 1310 of the first cavity 1408 is reduced. Thereby, the demagnetizing force is reduced at the permanent magnet 1310 (i.e. the force resistant to the demagnetization is increased).

The width of the first rib 1352 is relatively narrower at the downstream side 1614 in order to sufficiently secure a size of the first flux barrier 1406. If the width of the first rib 1352 is widened at the downstream side 1614, it may be insufficient for the size of the first flux barrier 1406 to control the flow of the magnetic flux to a desired level, and thus a magnetic flux control effect expected from the first flux barrier 1406 may be reduced. Therefore, the width of the first rib 1352 may be formed wide at the upstream side 1612 such that more magnetic flux can flow through the first rib 1352 and that the width of the first rib 1352 be formed relatively narrow at the downstream side 1614 such that the size of the first flux barrier 1406 is sufficiently secured.

The second rib 1354 adjacent to the second flux barrier 1416 is formed long in the rotational direction (the clockwise or counterclockwise direction) of the rotor 1304. Further, the second rib 1354 is configured such that a width thereof is gradually reduced in the rotational direction of the rotor 1304. That is, the width of the second rib 1354 is wider at an upstream side 1622 in the rotational direction of the rotor 1304, and is relatively narrower at a downstream side 1624. The width of the second rib 1354 is wider at the upstream side 1622 to induce the magnetic flux flowing to the permanent magnet 1310 inserted into the second cavity 1418 to flow to a side at which the width of the second rib 1354 is wide when the rotor 1304 rotates. As illustrated in FIG. 5 above, it can be found that the magnetic flux flowing from the stator 1302 to the rotor 1304 flows to the permanent magnet 1310 inserted into the second cavity 1418. The magnetic flux flowing to the permanent magnet inserted into the second cavity 1418 causes a demagnetizing force of the permanent magnet 1310. Thus, as the magnetic flux flowing to the permanent magnet 1310 decreases, the demagnetization of the permanent magnet 1310 can be reduced. To this end, in the motor according to the embodiment of the present disclosure, the second rib 1354 is formed to be wider at the upstream side 1622 such that the magnetic flux flowing from the stator 1302 to the rotor 1304 flows to the permanent magnet 1310 of the second cavity 1418 as little as possible. That is, the more magnetic flux flows to the upstream side 1622 at which the width of the second rib 1354 is wide, and the magnetic flux flowing to the permanent magnet 1310 of the second cavity 1418 is reduced. Thereby, the demagnetizing force is reduced at the permanent magnet 1310 (i.e. the force resistant to the demagnetization is increased).

The width of the second rib 1354 is relatively narrower at the downstream side 1624 in order to sufficiently secure a size of the second flux barrier 1416. If the width of the second rib 1354 is widened at the downstream side 1624, it may be insufficient for the size of the second flux barrier 1416 to control the flow of the magnetic flux to a desired level, and thus a magnetic flux control effect expected from the second flux barrier 1416 may be reduced. Therefore, the width of the second rib 1354 may be formed wide at the upstream side 1622 such that more magnetic flux can flow through the second rib 1354 and that the width of the second rib 1354 be formed relatively narrow at the downstream side 1624 such that the size of the second flux barrier 1416 is sufficiently secured.

Figure 17:
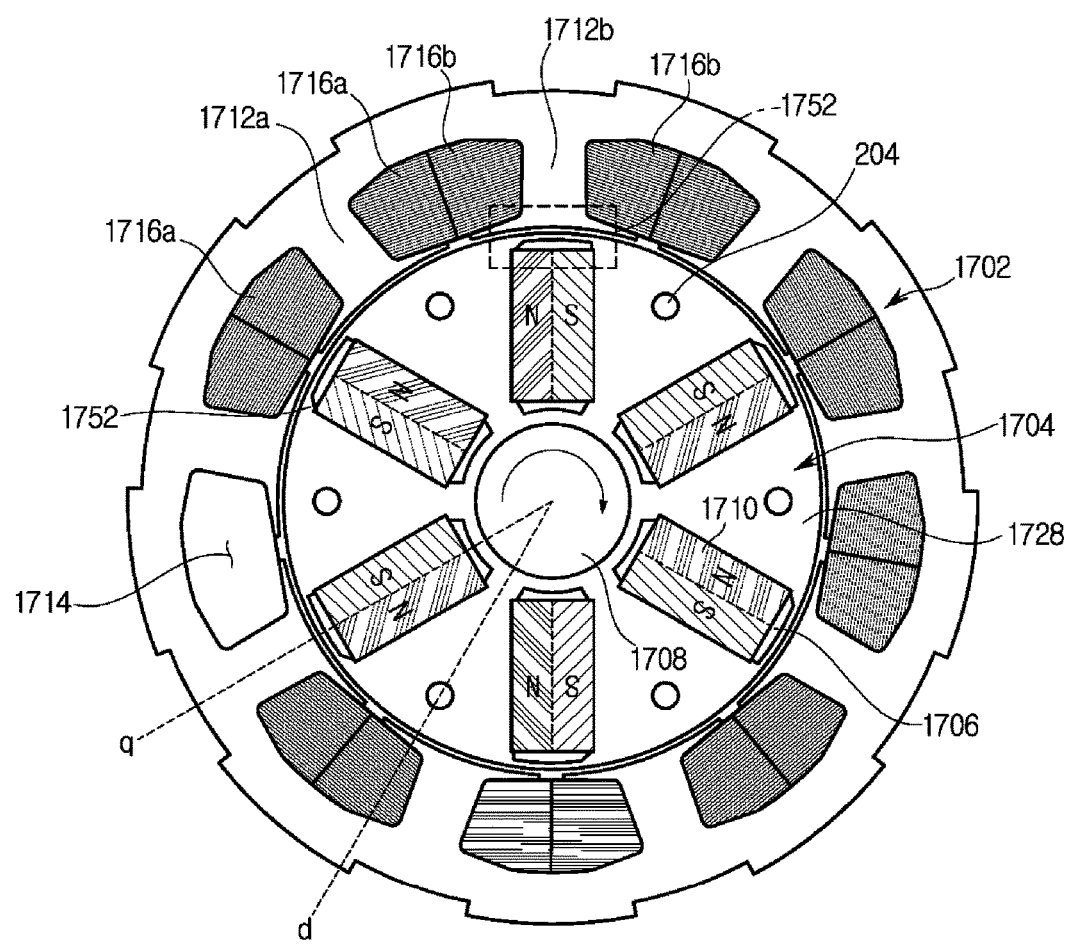
FIG. 17 is a top view of a stator and rotor of a motor according to an embodiment of the present disclosure.

FIG. 17 is a top view of a stator and rotor of a motor according to an embodiment of the present disclosure. An embodiment of the present disclosure illustrates a motor in which a single permanent magnet 1710 serves as one pole, a rotor 1704 and a rotating shaft 1708 rotate in one direction (e.g., a clockwise direction). Coils 1716 are wound around nine teeth 1712 at a stator 1702. A space called a slot 1714 is defined between the neighboring teeth 1712. A structure in which the coils 1716 are wound around the teeth 1712 of the stator 1702 will be described below using the two neighboring teeth 1712a and 1712b as an example. That is, as illustrated in FIG. 17, when the coil 1716a is wound around the tooth 1712a, the wound coil 1716a occupies the left- and right-hand spaces (slots) of the tooth 1712a. Further, when the coil 1716b is wound around the tooth 1712b, the wound coil 1716b occupies the left- and right-hand spaces of the tooth 1712b.

Six permanent magnets 1710 are held in the rotor 1704 in a radial shape to be symmetrical with respect to the rotating shaft 1708 and to face an outer circumferential surface of the rotor 1704. Because the plurality of permanent magnets held in the radial shape in this way have a spoke form, the concentrated flux type motor illustrated in FIG. 17 is referred to as a spoke type motor.

One permanent magnet 1710 serves as one pole. Thus, the motor illustrated in FIG. 17 is a motor with a 6-pole rotor 1704. Each permanent magnet 1710 has a linear "I" shape that is long from the rotating shaft 1708 toward the outer circumferential surface of the rotor 1704. The number of permanent magnets 1710 is not limited to six, and may be changed to realize desired characteristics (e.g. the number of poles) of the motor. Magnetizing directions of the permanent magnets of FIG. 17 will be described below in detail. The plurality of permanent magnets 1710 are disposed to face each other across a d axis. The permanent magnets 1710 facing each other across the d axis are magnetized to polarities (N and N poles or S and S poles) equal to each other. When magnetized along a q axis, each permanent magnet 1710 is magnetized to polarities (N and S poles or S and N poles) different from each other.

In the state in which each permanent magnet 1710 is inserted, flux barriers 1706 are formed at opposite ends of the permanent magnet 1710. Further, a rib 1752 is formed between one of the flux barriers 1706 of the rotor 1704 and an inner surface of the stator 1702. Shapes of the flux barriers and the rib in the motor are in close connection with generation of an electromagnetic excitation force, formation of a magnetic flux path, an increase/decrease in demagnetizing force, and so on. A method of minimizing demagnetization, i.e. maximizing a force resistant to the demagnetization, at the permanent magnet includes a method of increasing a thickness of the permanent magnet or a method of increasing a distance between the permanent magnet and the stator. The former may be responsible for an increase in cost of production of the motor because a larger permanent magnet is required, and the latter may be responsible for an increase in volume of the rotor (or the motor) because a wider space is required for disposition of the permanent magnet. In the motor according to the embodiment of the present disclosure, a structure of each rib of the rotor is proposed to minimize the demagnetization of the motor without increasing a size of the permanent magnet and a volume of the motor.

Figure 18:
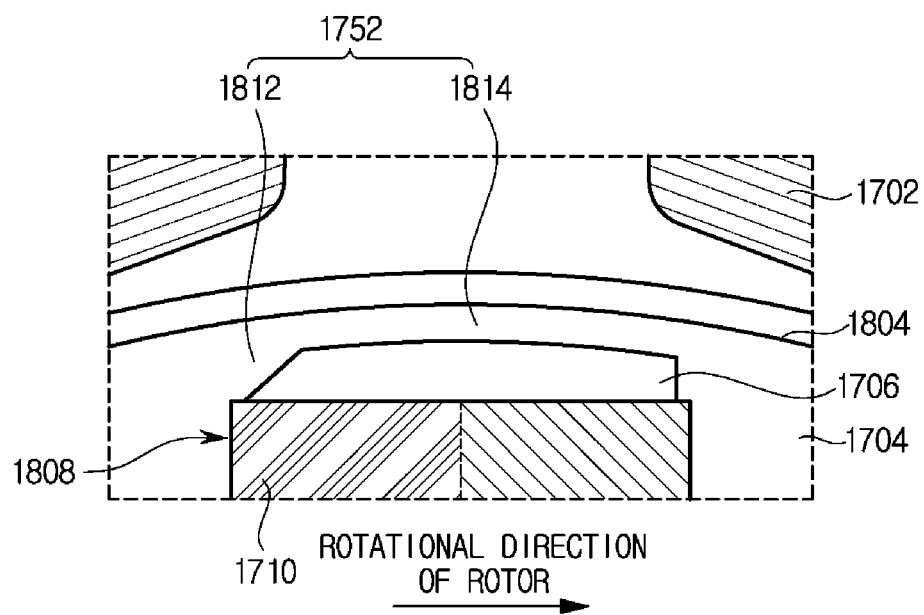
FIG. 18 is a view illustrating a shape of the rib of the rotor in the motor according to an embodiment of the present disclosure.

FIG. 18 is a view illustrating a shape of the rib of the rotor in the motor according to an embodiment of the present disclosure. As illustrated in FIG. 18, the rib 1752 is formed between the flux barrier 1706 and an outer circumferential surface 1804 of the rotor 1704. The rib 1752 adjacent to the flux barrier 1706 is formed long in a rotational direction (clockwise direction in FIG. 18) of the rotor 1704. Further, the rib 1752 has a shape in which a width thereof is gradually reduced in the rotational direction of the rotor 1704. That is, the width of the rib 1752 is wider at an upstream side 1812 in the rotational direction of the rotor 1704, and is relatively narrower at a downstream side 1814.

The width of the rib 1752 is wider at the upstream side 1812 to induce the magnetic flux flowing to the permanent magnet 1710 inserted into a cavity 1808 to flow to a side at which the width of the rib 1752 is wide. As illustrated in FIG. 5 above, it can be found that the magnetic flux flowing from the stator 1702 to the rotor 1704 flows to the permanent magnet 1710 inserted into the cavity 1808. The magnetic flux flowing to the permanent magnet inserted into the cavity 1808 causes a demagnetizing force of the permanent magnet 1710. Thus, as the magnetic flux flowing to the permanent magnet 1710 decreases, the demagnetization of the permanent magnet 1710 can be reduced. To this end, in the motor according to the embodiment of the present disclosure, the rib 1752 is formed to be wider at the upstream side 1812 such that the magnetic flux flowing from the stator 1702 to the rotor 1704 flows to the permanent magnet 1710 of the cavity 1808 as little as possible. That is, the more magnetic flux flows to the upstream side 1812 at which the width of the rib 1752 is wide, and the magnetic flux flowing to the permanent magnet 1710 of the cavity 1808 is reduced. Thereby, the demagnetizing force is reduced at the permanent magnet 1710 (i.e. the force resistant to the demagnetization is increased).

The width of the rib 1752 is relatively narrower at the downstream side 1814 in order to secure a large enough size of the flux barrier 1706 to control a flow of the magnetic flux to a desired level. If the width of the rib 1752 is widened at the downstream side 1814, the size of the flux barrier 1706 may be insufficient, and thus a magnetic flux control effect expected from the flux barrier 1706 may be reduced. Therefore, the width of the rib 1752 may be formed wide at the upstream side 1812 such that more magnetic flux can flow through the rib 1752 and that the width of the rib 1752 is formed relatively narrow at the downstream side 1814 such that the size of the flux barrier 1706 is sufficiently secured.

Figure 19:
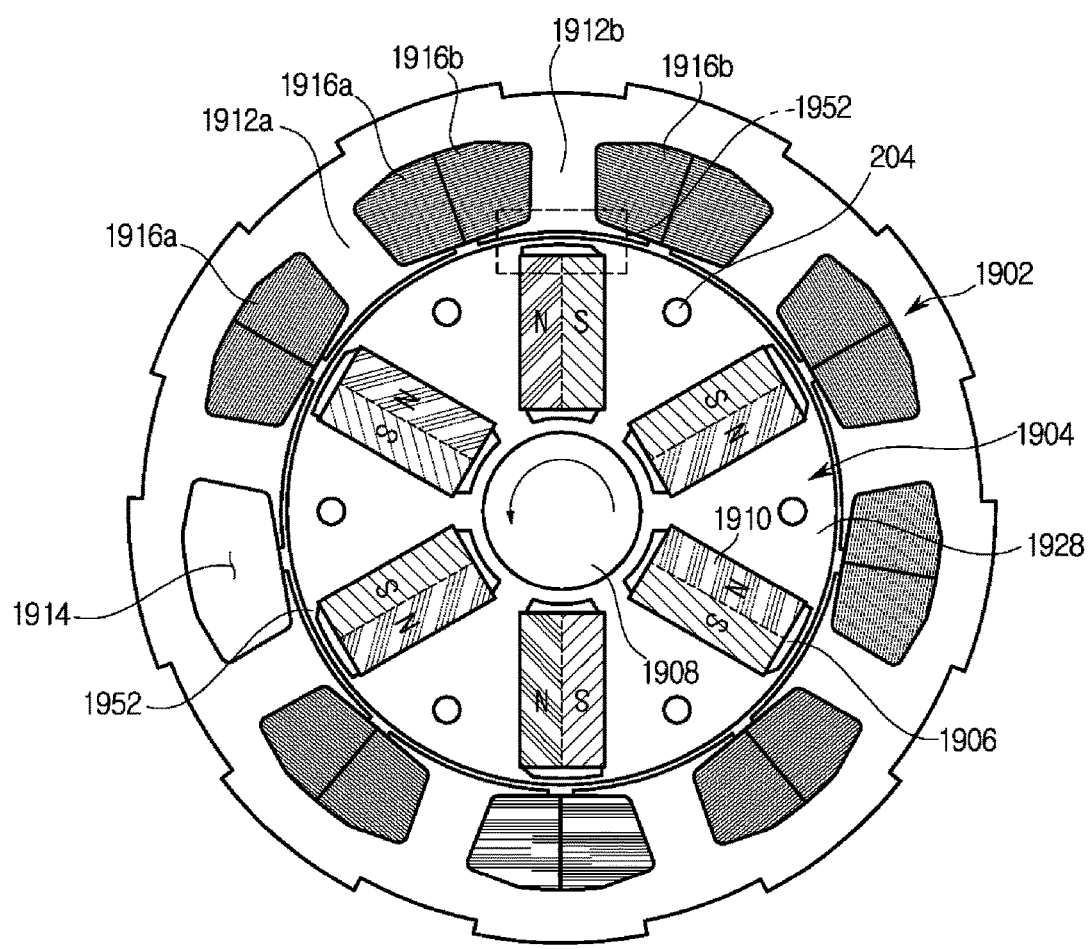
FIG. 19 is a top view of a stator and rotor of a motor according to an embodiment of the present disclosure.

FIG. 19 is a top view of a stator and rotor of a motor according to an embodiment of the present disclosure. An embodiment of the present disclosure illustrates a motor in which a single permanent magnet 1910 serves as one pole, a rotor 1904 and a rotating shaft 1908 rotate in one direction (e.g., a counterclockwise direction). Coils 1916 are wound around nine teeth 1912 at a stator 1902. A space called a slot 1914 is defined between the neighboring teeth 1912. A structure in which the coils 1916 are wound around the teeth 1912 of the stator 1902 will be described below using the two neighboring teeth 1912a and 1912b as an example. That is, as illustrated in FIG. 19, when the coil 1916a is wound around the tooth 1912a, the wound coil 1916a occupies the left- and right-hand spaces (slots) of the tooth 1912a. Further, when the coil 1916b is wound around the tooth 1912b, the wound coil 1916b occupies the left- and right-hand spaces of the tooth 1912b.

Six permanent magnets 1910 are held in a magnetic flux concentrating core 1928 of the rotor 1904 in a radial shape to be symmetrical with respect to the rotating shaft 1908 and to face an outer circumferential surface of the rotor 1904. Because the plurality of permanent magnets held in the radial shape in this way have a spoke form, the concentrated flux type motor illustrated in FIG. 19 is referred to as a spoke type motor.

One permanent magnet 1910 serves as one pole. Thus, the motor illustrated in FIG. 19 is a motor with a 6-pole rotor 1904. Each permanent magnet 1910 has a linear "I" shape that is long from the rotating shaft 1908 toward the outer circumferential surface of the rotor 1904. The number of permanent magnets 1910 is not limited to six, and may be changed to realize desired characteristics (e.g. the number of poles) of the motor. Magnetizing directions of the permanent magnets of FIG. 19 will be described below in detail. The plurality of permanent magnets 1910 are disposed to face each other across a d axis. The permanent magnets 1910 facing each other across the d axis are magnetized to polarities (N and N poles or S and S poles) equal to each other. When magnetized along a q axis, each permanent magnet 1910 is magnetized to polarities (N and S poles or S and N poles) different from each other.

In the state in which each permanent magnet 1910 is inserted, flux barriers 1906 are formed at opposite ends of the permanent magnet 1910. Further, a rib 1952 is formed between one of the flux barriers 1906 of the rotor 1904 and an inner surface of the stator 1902.

Shapes of the flux barriers and the rib in the motor are in close connection with generation of an electromagnetic excitation force, formation of a magnetic flux path, an increase/decrease in demagnetizing force, and so on. A method of minimizing demagnetization, i.e. maximizing a force resistant to the demagnetization, at the permanent magnet includes a method of increasing a thickness of the permanent magnet or a method of increasing a distance between the permanent magnet and the stator. The former may be responsible for an increase in cost of production of the motor because a larger permanent magnet is required, and the latter may be responsible for an increase in volume of the rotor (or the motor) because a wider space is required for disposition of the permanent magnet. In the motor according to the embodiment of the present disclosure, a structure of each rib of the rotor is proposed to minimize the demagnetization of the motor without increasing a size of the permanent magnet and a volume of the motor.

Figure 20:
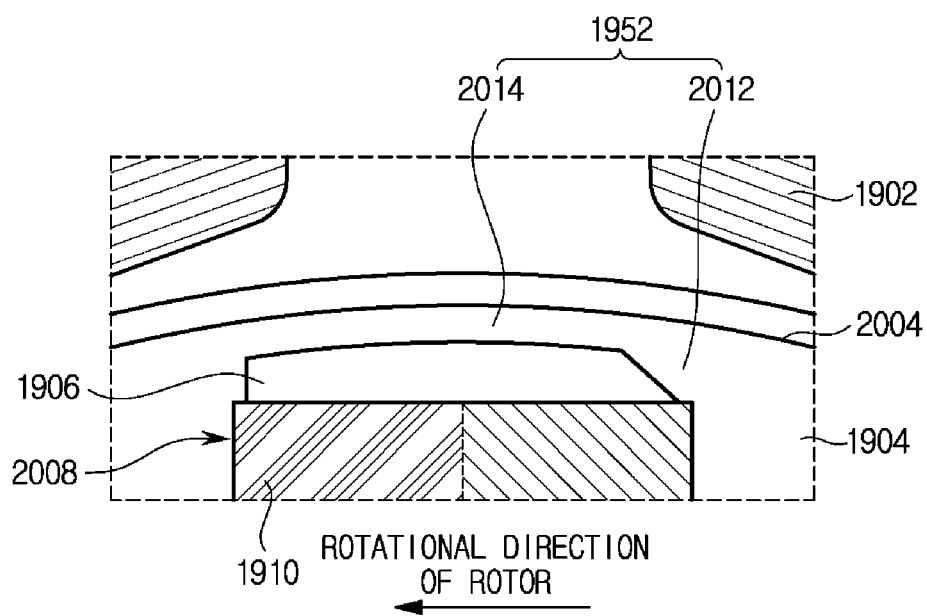
FIG. 20 is a view illustrating a shape of the rib of the rotor in the motor according to an embodiment of the present disclosure.

FIG. 20 is a view illustrating a shape of the rib of the rotor in the motor according to an embodiment of the present disclosure. As illustrated in FIG. 20, the rib 1952 is formed between the flux barrier 1906 and an outer circumferential surface 2004 of the rotor 1904. The rib 1952 adjacent to the flux barrier 1906 is formed long in a rotational direction (counterclockwise direction in FIG. 20) of the rotor 1904. Further, the rib 1952 has a shape in which a width thereof is gradually reduced in the rotational direction of the rotor 1904. That is, the width of the rib 1952 is wider at an upstream side 2012 in the rotational direction of the rotor 1904, and is relatively narrower at a downstream side 2014.

The reason the width of the rib 1952 is wider at the upstream side 2012 is to induce the magnetic flux flowing to the permanent magnet 1910 inserted into a cavity 2008 to flow to a side at which the width of the rib 1952 is wide. As illustrated in FIG. 5 above, it can be found that the magnetic flux flowing from the stator 1902 to the rotor 1904 flows to the permanent magnet 1910 inserted into the cavity 2008. The magnetic flux flowing to the permanent magnet inserted into the cavity 2008 causes a demagnetizing force of the permanent magnet 1910. Thus, as the magnetic flux flowing to the permanent magnet 1910 decreases, the demagnetization of the permanent magnet 1910 can be reduced. To this end, in the motor according to the embodiment of the present disclosure, the rib 1952 is formed to be wider at the upstream side 2012 such that the magnetic flux flowing from the stator 1902 to the rotor 1904 flows to the permanent magnet 1910 of the cavity 2008 as little as possible. That is, the more magnetic flux flows to the upstream side 2012 at which the width of the rib 1952 is wide, and the magnetic flux flowing to the permanent magnet 1910 of the cavity 2008 is reduced. Thereby, the demagnetizing force is reduced at the permanent magnet 1910 (i.e. the force resistant to the demagnetization is increased).

The width of the rib 1952 is relatively narrower at the downstream side 2014 in order to secure a large enough size of the flux barrier 1906 to control a flow of the magnetic flux to a desired level. If the width of the rib 1952 is widened at the downstream side 2014, the size of the flux barrier 1906 may be insufficient, and thus a magnetic flux control effect expected from the flux barrier 1906 may be reduced. Therefore, the width of the rib 1952 may be formed wide at the upstream side 2012 such that more magnetic flux can flow through the rib 1952 and that the width of the rib 1952 is formed relatively narrow at the downstream side 2014 such that the size of the flux barrier 1906 is sufficiently secured.

Figure 21:
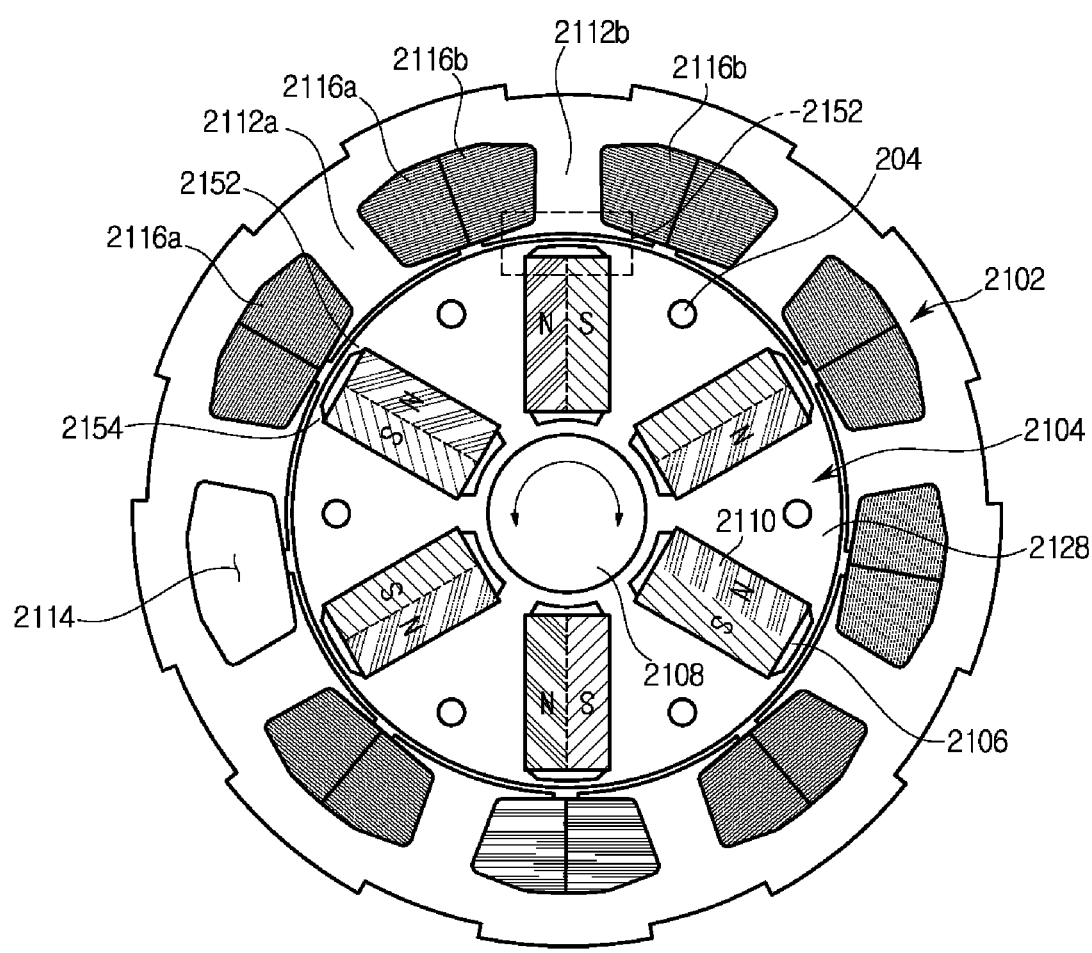
FIG. 21 is a top view of a stator and rotor of a motor according to an embodiment of the present disclosure.

FIG. 21 is a top view of a stator and rotor of a motor according to an embodiment of the present disclosure. An embodiment of the present disclosure illustrates a motor in which a single permanent magnet 2110 serves as one pole, a rotor 2104 and a rotating shaft 2108 rotate in both directions (e.g., clockwise and counterclockwise directions). Coils 2116 are wound around nine teeth 2112 at a stator 2102. A space called a slot 2114 is defined between the neighboring teeth 1912. A structure in which the coils 2116 are wound around the teeth 2112 of the stator 2102 will be described below using the two neighboring teeth 2112a and 2112b as an example. That is, as illustrated in FIG. 21, when the coil 2116a is wound around the tooth 2112a, the wound coil 2116a occupies the left- and right-hand spaces (slots) of the tooth 2112a. Further, when the coil 2116b is wound around the tooth 2112b, the wound coil 2116b occupies the left- and right-hand spaces of the tooth 2112b.

Six permanent magnets 2110 are held in a magnetic flux concentrating core 2128 of the rotor 2104 in a radial shape to be symmetrical with respect to the rotating shaft 2108 and to face an outer circumferential surface of the rotor 2104. Because the plurality of permanent magnets held in the radial shape in this way have a spoke form, the concentrated flux type motor illustrated in FIG. 21 is referred to as a spoke type motor.

One permanent magnet 2110 serves as one pole. Thus, the motor illustrated in FIG. 21 is a motor with a 6-pole rotor 2104. Each permanent magnet 2110 has a linear "I" shape that is long from the rotating shaft 2108 toward the outer circumferential surface of the rotor 2104. The number of permanent magnets 2110 is not limited to six, and may be changed to realize desired characteristics (e.g. the number of poles) of the motor. Magnetizing directions of the permanent magnets of FIG. 21 will be described below in detail. The plurality of permanent magnets 2110 are disposed to face each other across a d axis. The permanent magnets 2110 facing each other across the d axis are magnetized to polarities (N and N poles or S and S poles) equal to each other. When magnetized along a q axis, each permanent magnet 2110 is magnetized to polarities (N and S poles or S and N poles) different from each other.

In the state in which each permanent magnet 2110 is inserted, flux barriers 2106 are formed at opposite ends of the permanent magnet 2110. Further, ribs 2152 and 2154 are formed between one of the flux barriers 2106 of the rotor 2104 and an inner surface of the stator 2102.

Shapes of the flux barriers and the ribs in the motor are in close connection with generation of an electromagnetic excitation force, formation of a magnetic flux path, an increase/decrease in demagnetizing force, and so on. A method of minimizing demagnetization, i.e. maximizing a force resistant to the demagnetization, at the permanent magnet includes a method of increasing a thickness of the permanent magnet or a method of increasing a distance between the permanent magnet and the stator. The former may be responsible for an increase in cost of production of the motor because a larger permanent magnet is required, and the latter may be responsible for an increase in volume of the rotor (or the motor) because a wider space is required for disposition of the permanent magnet. In the motor according to the embodiment of the present disclosure, a structure of each rib of the rotor is proposed to minimize the demagnetization of the motor without increasing a size of the permanent magnet and a volume of the motor.

Figure 22:
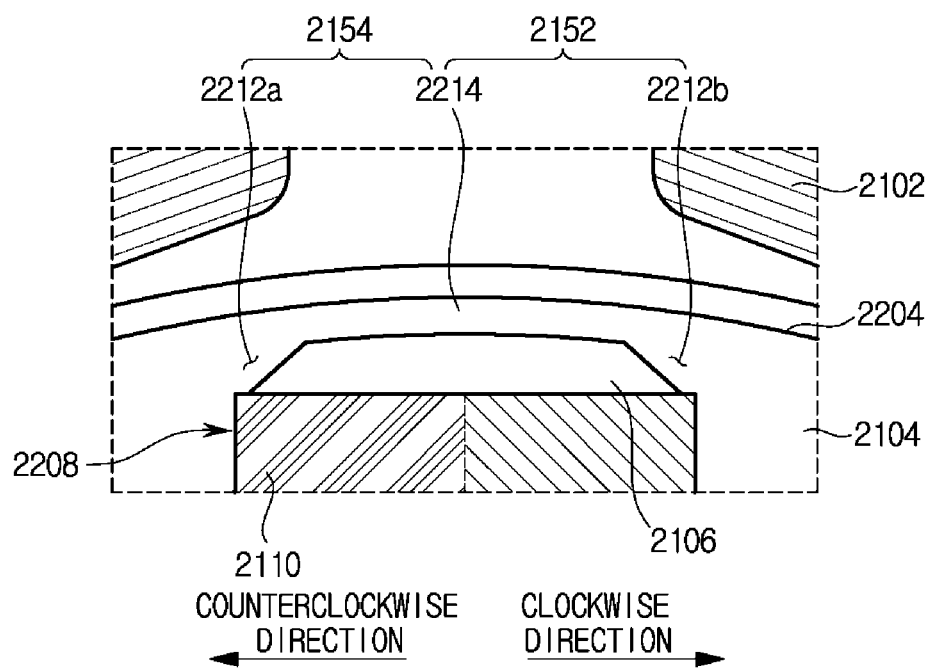
FIG. 22 is a view illustrating shapes of the ribs of the rotor in the motor, as illustrated in FIG. 21, according to an embodiment of the present disclosure.

FIG. 22 is a view illustrating shapes of the ribs of the rotor in the motor according to an embodiment of the present disclosure. As illustrated in FIG. 22, the ribs 2152 and 2154 are formed between the flux barrier 2106 and an outer circumferential surface 2204 of the rotor 2104. The ribs 2152 and 2154 are formed in one body, but are given two reference numerals for the convenience of description. This is because the ribs 2152 and 2154 of the motor according to an embodiment of the present disclosure have shapes that take into consideration bidirectional rotation of the rotor 2104. This will be described below in detail. The ribs 2152 and 2154 adjacent to the flux barrier 2106 are formed long in rotational directions (clockwise and counterclockwise directions in FIG. 22) of the rotor 2104. Further, each of the ribs 2152 and 2154 has a shape in which a width thereof is gradually reduced in the rotational direction of the rotor 2104. That is, the width of the rib 2152 considering the counterclockwise rotation of the rotor 2104 is wider at an upstream side 2212a in the rotational direction (counterclockwise direction) of the rotor 2104, and is relatively narrower at a downstream side 2214. Further, the width of the rib 2154 considering the clockwise rotation of the rotor 2104 is wider at an upstream side 2212b in the rotational direction (counterclockwise direction) of the rotor 2104, and is relatively narrower at a downstream side 2214.

The width of the rib 2152 is wider at the upstream side 2212a to induce the magnetic flux flowing to the permanent magnet 2110 inserted into a cavity 2208 to flow to a side at which the width of the rib 2152 is wide. As illustrated in FIG. 5 above, it can be found that the magnetic flux flowing from the stator 2102 to the rotor 2104 flows to the permanent magnet 2110 inserted into the cavity 2208. The magnetic flux flowing to the permanent magnet inserted into the cavity 2208 causes a demagnetizing force of the permanent magnet 2110. Thus, as the magnetic flux flowing to the permanent magnet 2110 decreases, the demagnetization of the permanent magnet 2110 can be reduced. To this end, in the motor according to the embodiment of the present disclosure, the rib 2152 is formed to be wider at the upstream side 2212a such that the magnetic flux flowing from the stator 2102 to the rotor 2104 flows to the permanent magnet 2110 of the cavity 2208 as little as possible. That is, the more magnetic flux flows to the upstream side 2212a at which the width of the rib 2152 is wide when the rotor 2104 rotates in the clockwise direction, and the magnetic flux flowing to the permanent magnet 2110 of the cavity 2208 is reduced. Thereby, the demagnetizing force is reduced at the permanent magnet 2110 (i.e. the force resistant to the demagnetization is increased). Similar to the rib 2152, in the case of the rib 2154, the more magnetic flux flows to the upstream side 2212b at which the width of the rib 2154 is wide when the rotor 2104 rotates in the counterclockwise direction, and the magnetic flux flowing to the permanent magnet 2110 of the cavity 2208 is reduced. Thereby, the demagnetizing force is reduced at the permanent magnet 2110 (i.e. the force resistant to the demagnetization is increased).

The width of each of the ribs 2152 and 2154 is relatively narrower at the downstream side 2214 in order to secure an enough size of the flux barrier 2106 to control a flow of the magnetic flux to a desired level. If the width of each of the ribs 2152 and 2154 is widened at the downstream side 2214, the size of the flux barrier 2106 may be insufficient, and thus a magnetic flux control effect expected from the flux barrier 2106 may be reduced. Therefore, the width of each of the ribs 2152 and 2154 may be formed wide at each of the upstream sides 2212a and 2212b such that more magnetic flux can flow through each of the ribs 2152 and 2154 and that the width of each of the ribs 2152 and 2154 is formed relatively narrow at the common downstream side 2214 such that the size of the flux barrier 2106 is sufficiently secured.

Figure 23:
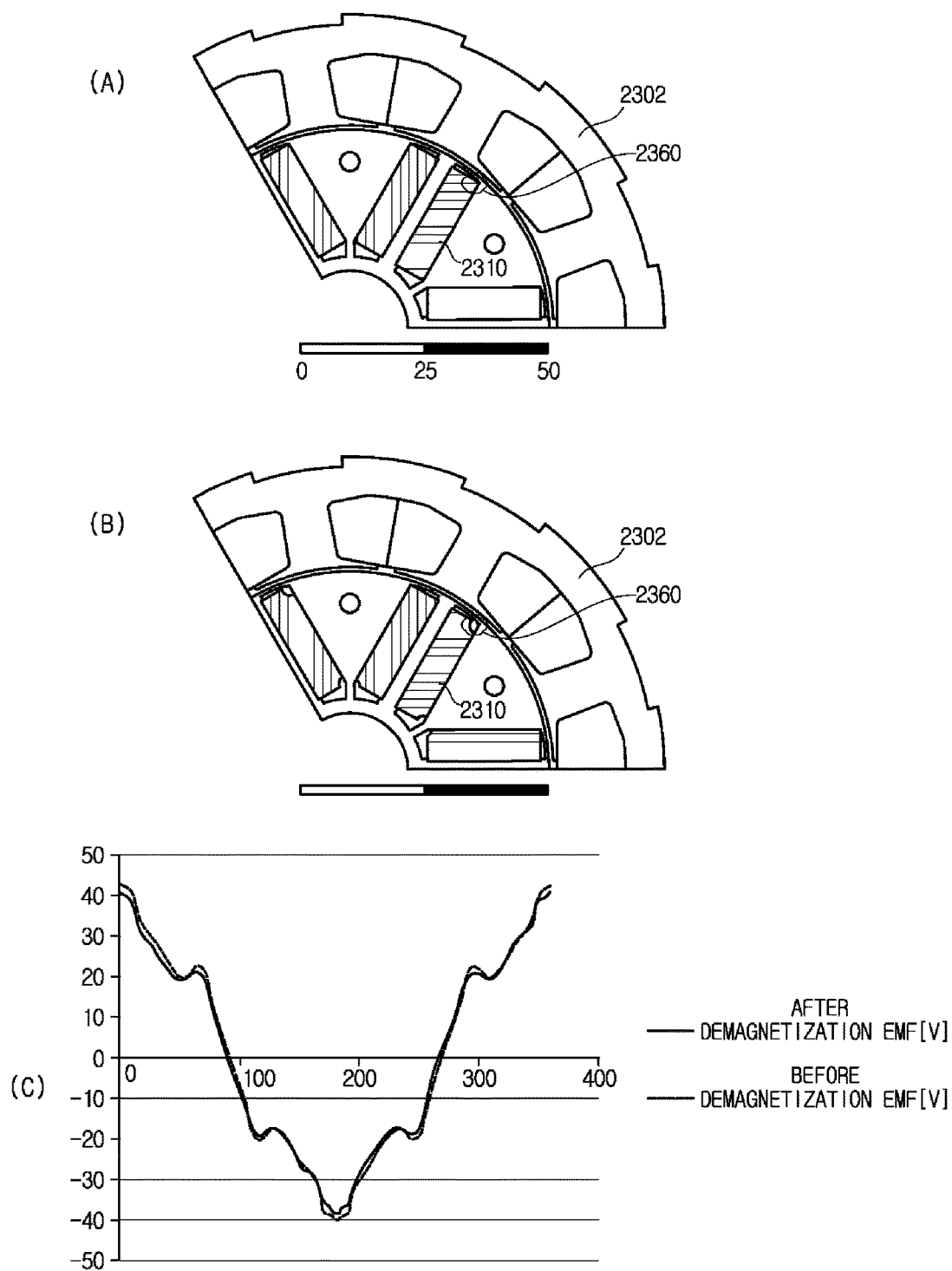
FIG. 23 is a view illustrating a result of demagnetization analysis when shapes of ribs of a unidirectional rotary motor are symmetrical.

FIG. 23 is a view illustrating a result of demagnetization analysis when shapes of ribs of a unidirectional rotary motor are symmetrical. The shapes of the ribs of the unidirectional rotary motor according to the embodiment of the present disclosure have the asymmetrical structure as illustrated in FIG. 7 or 11. The ribs of the unidirectional rotary motor acting as a comparative model illustrated in FIG. 23 are symmetrical, and the shapes thereof are different from those of the embodiment of the present disclosure. For reference, an electric current of 50 A (peak) was applied at a temperature of −20° C. for the demagnetization analysis of FIG. 23.

FIG. 23(A) illustrates a magnetic force of a permanent magnet 2310 before the demagnetization analysis of the unidirectional rotary motor in which the ribs have the symmetrical structure, and FIG. 23(B) illustrates the magnetic force of the permanent magnet 2310 after the demagnetization analysis of the unidirectional rotary motor in which the ribs have the symmetrical structure. In FIGS. 23(A) and 23(B), a level of demagnetization after the demagnetization analysis can be recognized by comparing corner portions 2360 of the permanent magnet 2310 which face a stator 2302.

FIG. 23(C) is a graph for comparing electromotive forces (EMFs) before and after the demagnetization analysis of the unidirectional rotary motor in which the ribs have the symmetrical structure. A difference between the EMFs before and after the demagnetization analysis can be more clearly found from the graph illustrated in FIG. 23(C). That is, the EMF before the demagnetization analysis is 33.71075963 V, and the EMF after the demagnetization analysis is 32.46415948 V, so that it can be found that the difference is about 1.24660015 V. Calculating this in terms of percentage, the difference is about 3.70%. Consequently, it can be found that a rate of demagnetization in the rib structure as illustrated in FIG. 23 is about 3.70%.

Figure 24:
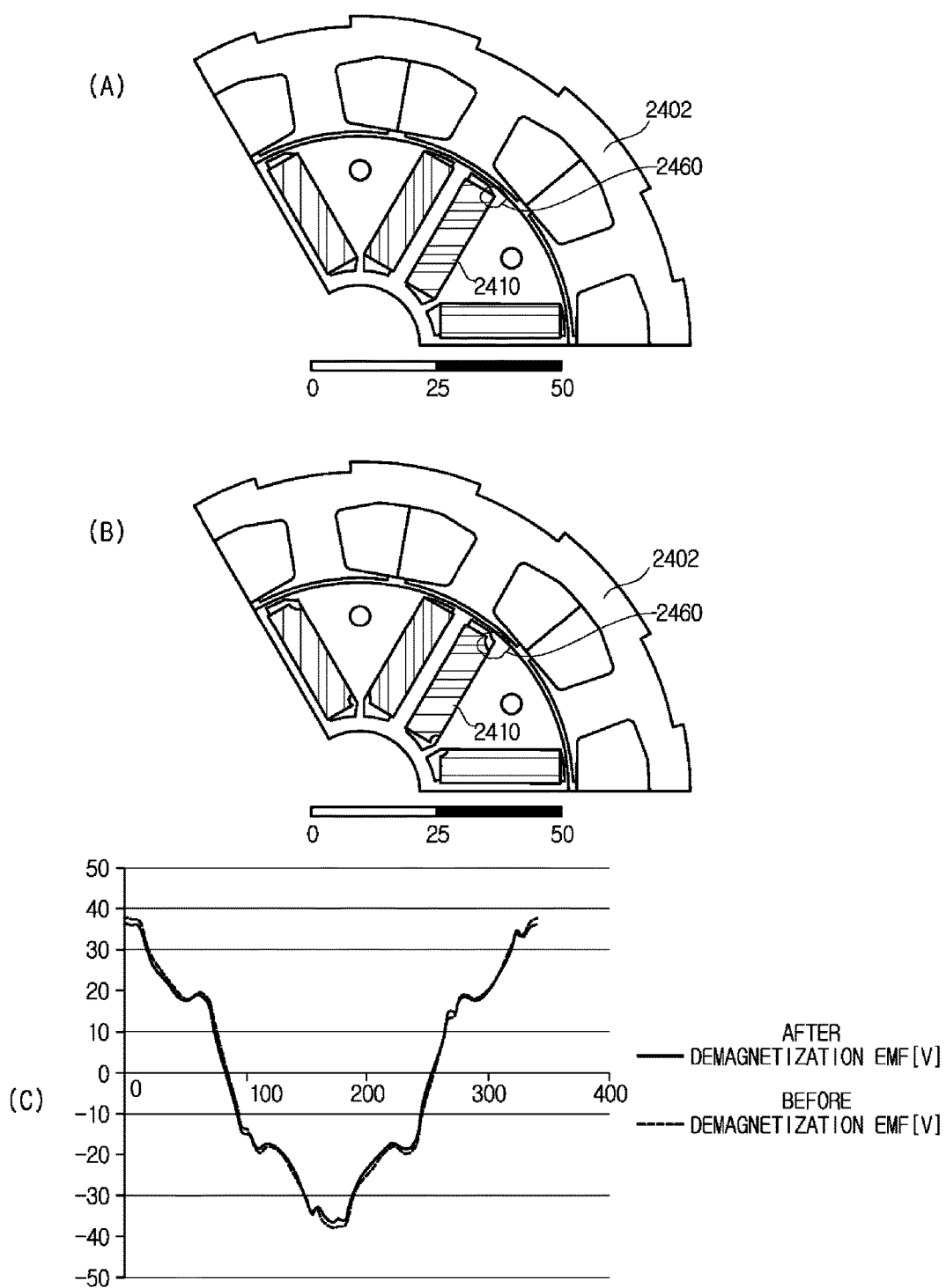
FIG. 24 is a view illustrating a result of demagnetization analysis when the ribs of the unidirectional rotary motor (counterclockwise rotary motor) according to an embodiment of the present disclosure are asymmetrical.

FIG. 24 is a view illustrating a result of demagnetization analysis when the ribs of the unidirectional rotary motor (counterclockwise rotary motor) according to an embodiment of the present disclosure are asymmetrical. For reference, an electric current of 50 A (peak) was applied at a temperature of −20° C. for the demagnetization analysis of FIG. 24.

FIG. 24(A) illustrates a magnetic force of a permanent magnet 2410 before the demagnetization analysis of the unidirectional rotary motor in which the ribs have the symmetrical structure, and FIG. 24(B) illustrates the magnetic force of the permanent magnet 2410 after the demagnetization analysis of the unidirectional rotary motor in which the ribs have the symmetrical structure. In FIGS. 24(A) and 24(B), a level of demagnetization after the demagnetization analysis can be recognized by comparing corner portions 2460 of the permanent magnet 2410 which face a stator 2402.

FIG. 24(C) is a graph for comparing EMFs before and after the demagnetization analysis of the unidirectional rotary motor in which the ribs have the symmetrical structure. A difference between the EMFs before and after the demagnetization analysis can be more clearly found from the graph illustrated in FIG. 24(C). That is, the EMF before the demagnetization analysis is 33.55994991 V, and the EMF after the demagnetization analysis is 32.57764857 V, so that it can be found that the difference is about 0.98230134 V. Calculating this in terms of percentage, the difference is about 2.93%. Consequently, it can be found that the rate of demagnetization in the flux barrier structure according to an embodiment of the present disclosure is about 2.93%.

In this way, in comparison of the result of the demagnetization analysis of the unidirectional rotary motor according to an embodiment of the present disclosure with the result of the demagnetization analysis of the comparative model of FIG. 23, the result of the demagnetization analysis of the comparative model of FIG. 23 shows that the rate of demagnetization is about 3.70%, whereas the result of the demagnetization analysis of the unidirectional rotary motor, as illustrated in FIG. 24, according to an embodiment of the present disclosure shows that the rate of demagnetization is about 2.93%. Therefore, it can be found that the rate of demagnetization in the asymmetrical rib structure of the unidirectional rotary motor according to an embodiment of the present disclosure is relatively low.

Consequently, it can be found that the objective of the present disclosure, i.e. to reduce the rate of demagnetization (or increase the force resistant to the demagnetization) of the motor, is reliably achieved through the rib structure as in the embodiment of the present disclosure. Further, even in the case of the unidirectional rotary motor (clockwise rotary motor) according to an embodiment of the present disclosure, it is possible to obtain an effect of reducing the rate of demagnetization to a level similar to the foregoing.

Figure 25:
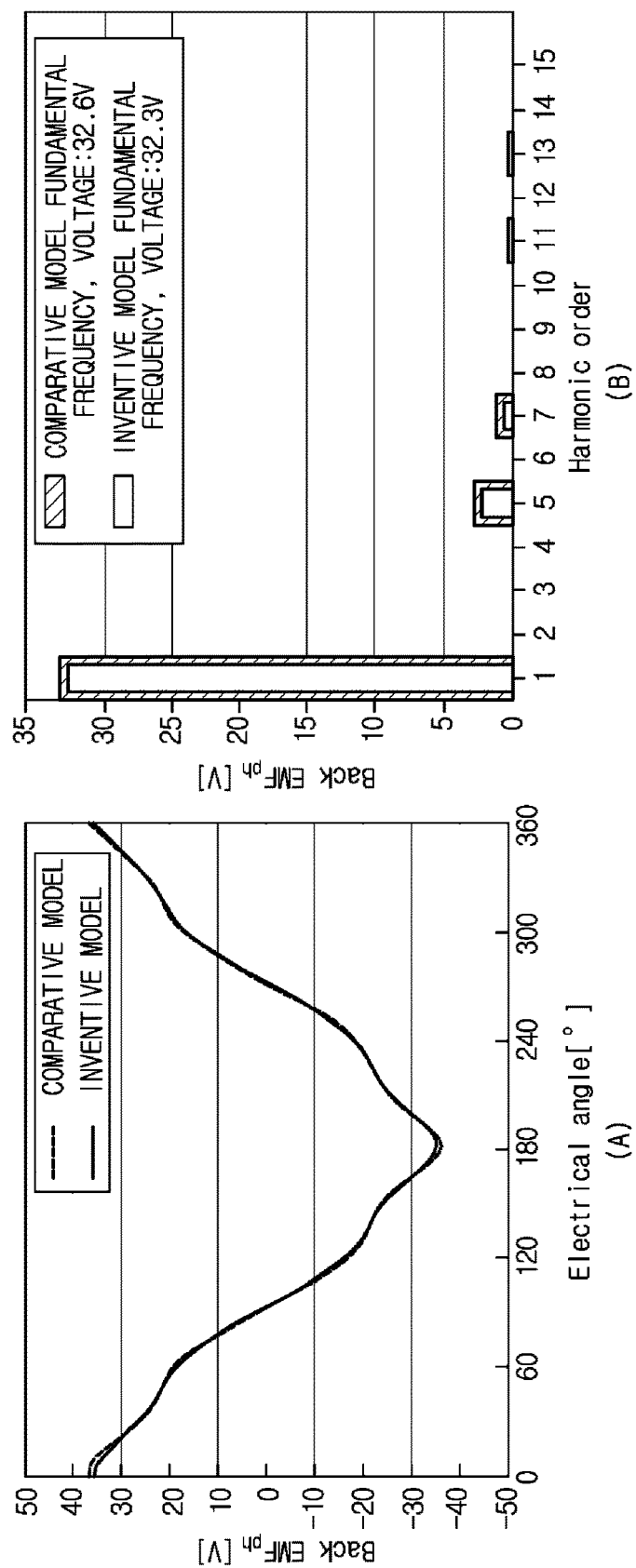
FIG. 25 is a view illustrating results of analyzing no-load back-EMFs and harmonics of the bidirectional rotary motor according to an embodiment of the present disclosure and a comparative model.

FIG. 25 is a view illustrating results of analyzing no-load back-EMFs and harmonics of the bidirectional rotary motor according to an embodiment of the present disclosure and the comparative model. FIG. 25(A) illustrates results of analyzing no-load back-EMFs of the bidirectional rotary motor according to an embodiment of the present disclosure and the comparative model, and FIG. 25(B) illustrates results of analyzing harmonics of the bidirectional rotary motor according to an embodiment of the present disclosure and the comparative model. It can be found from the results of analyzing no-load back-EMFs and harmonics in FIGS. 25(A) and 25(B) that the rate of demagnetization of the bidirectional rotary motor according to an embodiment of the present disclosure is relatively low.

Figure 26:
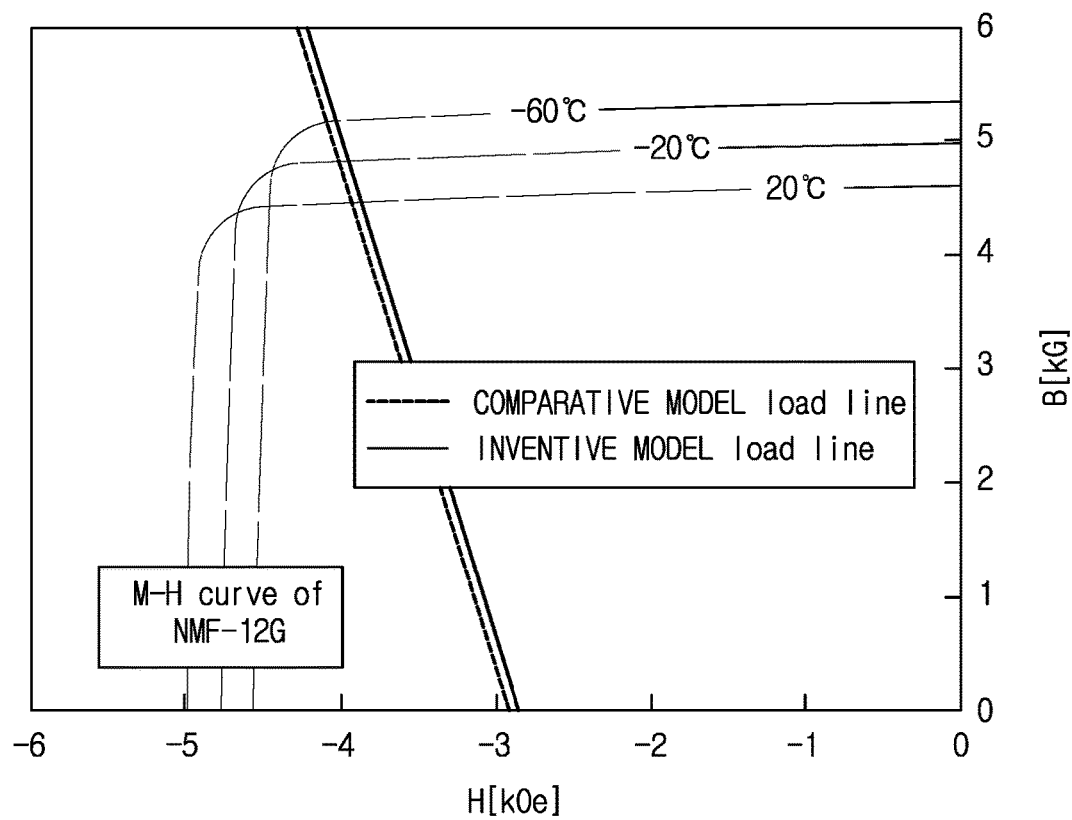
FIG. 26 illustrates load lines at ends of the permanent magnets of the bidirectional rotary motor according to an embodiment of the present disclosure and the comparative model.

FIG. 26 illustrates load lines at ends of the permanent magnets of the bidirectional rotary motor according to an embodiment of the present disclosure and the comparative model. As illustrated in FIG. 26, in comparison with demagnetizing forces at the ends of the permanent magnets, it can be found that the demagnetizing force of the bidirectional rotary motor according to an embodiment of the present disclosure is relatively lower than that of the comparative model. For reference, an electric current of 30 Å (peak) was applied for the analysis of FIG. 26.

According to the embodiments of the present disclosure, the demagnetization of the permanent magnet motor is minimized and the force resistant to the demagnetization is improved without increasing the thickness of each permanent magnet and the distance between each permanent magnet and the stator. In this way, because the thickness of each permanent magnet and the distance between each permanent magnet and the stator are not increased, the cost of production of the motor is not increased, and the volume of the motor is not increased. However, the force resistant to the demagnetization of the motor can be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A rotor to rotate in one direction in a motor, the rotor comprising:
   a first cavity and a second cavity to hold a first permanent magnet and a second permanent magnet in parallel;
   a first flux barrier and a second flux barrier to communicate with respective ends of the first cavity and the second cavity nearest to an outer circumferential surface of the rotor; and
   respective ribs formed between the outer circumferential surface of the rotor and the first flux barrier and the second flux barrier,
   wherein a first end of each of the ribs at an upstream side in the rotational direction of the rotor is wider than a second end of the rib at a downstream side in the rotational direction of the rotor, and
   wherein one of the first cavity and the second cavity is arranged to be closer to the outer circumferential surface of the rotor than the other of the first cavity and the second cavity.

2. The rotor according to claim 1, wherein the ribs are elongated in a circumferential direction of the rotor.

3. The rotor according to claim 2, wherein
   a width of the first end of each of the ribs is sharply reduced in the rotational direction of the rotor, and
   a width of the second end of each of the ribs is gently reduced in the rotational direction of the rotor.

4. The rotor according to claim 1, wherein each of the flux barriers is configured such that a width of one end of each of the flux barriers at an upstream side in a rotational direction of the rotor is narrower than a width of the other end of each of the flux barriers at a downstream side in the rotational direction of the rotor.

5. The rotor according to claim 1, wherein the first cavity, the first flux barrier, and a first rib of the respective ribs are continuously formed in a direction toward the outer circumferential surface of the rotor.

6. The rotor according to claim 1, further comprising:
   a third cavity to hold a third permanent magnet,
   wherein the first cavity and the third cavity together constitute one pole, and
   the first cavity and the third cavity are radially disposed around a rotating shaft of the rotor toward the outer circumferential surface of the rotor.

7. The rotor according to claim 6, wherein the first cavity and the third cavity together form a "V" shape in which the first and second cavities spread from the rotating shaft of the rotor toward the outer circumferential surface of the rotor.

* * * * *